(12) United States Patent
Pesavento et al.

(10) Patent No.: US 9,916,484 B2
(45) Date of Patent: Mar. 13, 2018

(54) RFID TAG LOCATION USING SYNTHESIZED-BEAM RFID READERS

(71) Applicant: Impinj, Inc., Seattle, WA (US)

(72) Inventors: Alberto Pesavento, Seattle, WA (US); Christopher J. Diorio, Shoreline, WA (US)

(73) Assignee: IMPINJ, INC., Seattle, WA (US)

( * ) Notice: Subject to any disclaimer, the term of this patent is extended or adjusted under 35 U.S.C. 154(b) by 0 days.

(21) Appl. No.: 15/588,119

(22) Filed: May 5, 2017

(65) Prior Publication Data

US 2017/0243032 A1 Aug. 24, 2017

Related U.S. Application Data

(63) Continuation-in-part of application No. 15/075,214, filed on Mar. 21, 2016, now Pat. No. 9,652,643, which is a continuation of application No. 14/388,793, filed as application No. PCT/US2014/026319 on Mar. 13, 2014, now Pat. No. 9,373,012.

(60) Provisional application No. 61/953,426, filed on Mar. 14, 2014, provisional application No. 61/784,035, filed on Mar. 14, 2013, provisional application No. 61/887,238, filed on Oct. 4, 2013.

(51) Int. Cl.
*G06K 7/10* (2006.01)
*G06Q 10/08* (2012.01)

(52) U.S. Cl.
CPC ..... *G06K 7/10297* (2013.01); *G06K 7/10158* (2013.01); *G06K 7/10178* (2013.01); *G06K 7/10316* (2013.01); *G06Q 10/087* (2013.01)

(58) Field of Classification Search
CPC .................................................. G06K 7/10178
USPC ........................................ 235/439, 451, 385
See application file for complete search history.

(56) References Cited

U.S. PATENT DOCUMENTS

| | | | |
|---|---|---|---|
| 7,385,525 B2 * | 6/2008 | Ho | G07B 15/063 340/905 |
| 9,178,277 B1 | 11/2015 | Moretti et al. | |
| 2005/0212676 A1 | 9/2005 | Steinberg | |
| 2006/0022800 A1 | 2/2006 | Krishna et al. | |
| 2009/0309704 A1 | 12/2009 | Chang et al. | |

(Continued)

FOREIGN PATENT DOCUMENTS

WO 2003061366 A2 7/2003

OTHER PUBLICATIONS

International Search Report and Written Opinion for PCT/2014/026319 filed on Mar. 13, 2014, dated Jul. 30, 2014.

*Primary Examiner* — Toan Ly
(74) *Attorney, Agent, or Firm* — Turk IP Law, LLC

(57) ABSTRACT

Synthesized-beam RFID readers may be used to locate RFID tags. In one embodiment, a tag's response rates on different beams can be used, along with the target locations of those beams, to estimate the tag's location. The estimated tag location is within a region where beams with nonzero tag response rates overlap, and the distances of the estimated tag location from any two different beam target locations may correspond to a ratio of tag response rates on the two different beams. In another embodiment, a tag's response rates on different beam pairs configured to cooperatively power RFID tags can be used, along with the target locations of those beam pairs, to estimate the tag's location.

20 Claims, 24 Drawing Sheets

(56) References Cited

U.S. PATENT DOCUMENTS

| | | | |
|---|---|---|---|
| 2010/0207738 A1* | 8/2010 | Bloy | G01S 5/0215 340/10.3 |
| 2010/0219953 A1 | 9/2010 | Bloy | |
| 2010/0225480 A1* | 9/2010 | Bloy | G01S 5/0215 340/572.1 |
| 2011/0025474 A1 | 2/2011 | Küg et al. | |
| 2011/0090059 A1 | 4/2011 | Sadr | |
| 2011/0187600 A1 | 8/2011 | Landt | |

* cited by examiner

SIGNAL PATH DURING R→T

SIGNAL PATH DURING T→R

RFID TAG LOCATION USING SYNTHESIZED-BEAM RFID READERS

CROSS REFERENCE TO RELATED APPLICATIONS

This application is a continuation-in-part under 35 U.S.C. § 120 of a co-pending U.S. patent application Ser. No. 15/075,214 filed on Mar. 21, 2016, which is a continuation of U.S. Pat. No. 9,373,012 issued on Jun. 21, 2016, which was a national phase application of International Application no. PCT/US14/26319 filed on Mar. 13, 2014 which claims priority to U.S. Provisional Patent Application Ser. No. 61/784,035 filed on Mar. 14, 2013 and 61/887,238 filed on Oct. 4, 2013. The disclosures of these provisional patent applications are hereby incorporated by reference for all purposes.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package.

In principle, RFID techniques entail using an RFID reader to inventory one or more RFID tags, where inventorying involves at least singulating a tag and receiving an identifier from the singulated tag. "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. The reader transmitting a Radio-Frequency (RF) wave performs the interrogation. The RF wave is typically electromagnetic, at least in the far field. The RF wave can also be predominantly electric or magnetic in the near or transitional near field. The RF wave may encode one or more commands that instruct the tags to perform one or more actions.

In typical RFID systems, an RFID reader transmits a modulated RF inventory signal (a command), receives a tag reply, and transmits an RF acknowledgement signal responsive to the tag reply. A tag that senses the interrogating RF wave may respond by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identities, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section included an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to locating RFID tags using synthesized-beam RFID readers. A synthesized-beam RFID reader, which comprises at least one RFID reader and an antenna array, electrically synthesizes multiple beam patterns by adjusting the signals provided to the antenna elements of the array. The multiple beam patterns may point in different physical directions, may provide different beam shapes, may provide different physical coverage, or a may provide mix of these attributes. The reader may comprise single or multiple transmitters, single or multiple receivers, be separate from and connected to elements of the antenna array, or be distributed and embedded within the elements of the array. Either the reader or an array controller may adjust the phase and/or amplitude of the signals provided to the array elements to synthesize the multiple beams. The antenna array may comprise multiple discrete antenna elements or may employ a continuous structure that can emulate multiple antennas. By switching among the beams, a synthesized-beam reader may scan its environment, essentially steering its gaze in different directions and with potentially different beam shapes as it scans. As a simple but not-limiting example of a synthesized-beam system, consider the antenna array on a U.S. Navy ship that forms a synthesized-beam radar, and envision the radar scanning the environment to inventory RFID tags rather than scanning the environment to detect distant ships or airplanes. Like a synthesized-beam radar, a synthesized-beam RFID reader may use multiple RF frequencies, different beam shapes, different beam directions, and different signal waveshapes to inventory/locate/track its target tags.

Synthesized-beam RFID readers may be used to locate RFID tags. In one embodiment, a tag's response rates on different beams can be used, along with the target locations of those beams, to estimate the tag's location. The estimated tag location is within a region where beams with nonzero tag response rates overlap, and the distances of the estimated tag location from any two different beam target locations may correspond to a ratio of tag response rates on the two different beams. In another embodiment, a tag's response rates on different beam pairs configured to cooperatively power RFID tags can be used, along with the target locations of those beam pairs, to estimate the tag's location.

According to some examples, a method to estimate a location of a Radio Frequency Identification (RFID) integrated circuit (IC) coupled to an antenna is provided. The method includes generating multiple radio-frequency beams, where each beam is directed to a different target location, transmitting multiple interrogating signals on each beam, and receiving, on each beam, at least one response from the IC to the interrogating signals. The method may further include determining a response rate for each beam, selecting a first beam having a first response rate and a second beam having a second response rate, where the first beam partially overlaps the second beam to form an overlap region, and using a target location of the first beam, a target location of the second beam, and the first and second response rates to estimate the IC location within the overlap region.

According to other examples, a method to estimate a location of an RFID IC coupled to an antenna is provided. The method includes generating multiple pairs of radio-frequency (RF) beams, where each beam pair is directed to a different target location and the beams within each beam pair cooperatively provide RF power to the target location, transmitting multiple interrogating signals on at least one beam of each beam pair, and receiving, on at least one beam of each beam pair, at least one response from the IC to the interrogating signals. The method may further include determining a response rate for each beam pair, selecting a first beam pair having a first response rate and a second beam pair having a second response rate, where the first beam pair partially overlaps the second beam pair to form an overlap region, and using a target location of the first beam pair, a target location of the second beam pair, and the first and second response rates to estimate the IC location within the overlap region.

According to further examples, a method for an RFID synthesized-beam reader to estimate a location of an RFID IC coupled to an antenna is provided. The method includes serially synthesizing each of multiple beams according to a scan pattern, where each beam is directed to a different target location, transmitting a series of interrogating signals on each beam, and receiving, on each beam, at least one response from the IC to the series of interrogating signals. The method may further include determining a response rate for each beam, selecting a first beam having a first response rate and a second beam having a second response rate, where the first beam partially overlaps the second beam to form an overlap region, and using a target location of the first beam, a target location of the second beam, and the first and second response rates to estimate the IC location within the overlap region.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which.

DETAILED DESCRIPTION

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM. RAM, SRAM. DRAM, NVM, EEPROM, FLASH, Fuse, MRAM, FRAM, and other similar information-storage technologies as will be known to those skilled in the art, and may be volatile or not. Some portions of memory may be writeable and some not. "Command" refers to a reader request for one or more tags to perform one or more actions, and includes one or more tag instructions preceded by a command identifier or command code that identifies the command and/or the tag instructions. "instruction" refers to a request to a tag to perform a single explicit action (e.g., write data into memory). "Program" refers to a request to a tag to perform a set or sequence of instructions (e.g., read a value from memory and, if the read value is less than a threshold then lock a memory word). "Protocol" refers to an industry standard for communications between a reader and a tag (and vice versa), such as the Class-1 Generation-2 UHF RFID Protocol for Communications at 860 MHz-960 MHz by GS1 EPCglobal, Inc. ("Gen2 Specification"), versions 1.2.0 and 2.0 of which are hereby incorporated by reference.

Figure 1:
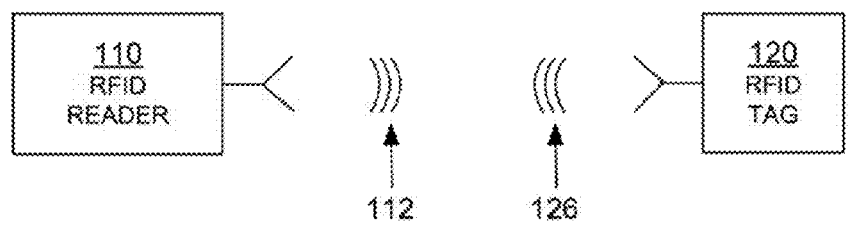
FIG. 1 is a block diagram of components of an RFID system.

FIG. 1 is a diagram of the components of a typical RFID system 100, incorporating embodiments. An RFID reader 110 transmits an interrogating RF signal 112. RFID tag 120 in the vicinity of RFID reader 110 senses interrogating RF signal 112 and generate signal 126 in response. RFID reader 110 senses and interprets signal 126. The signals 112 and 126 may include RF waves and/or non-propagating RF signals (e.g., reactive near-field signals).

Reader 110 and tag 120 communicate via signals 112 and 126. When communicating, each encodes, modulates, and transmits data to the other, and each receives, demodulates, and decodes data from the other. The data can be modulated onto, and demodulated from, RF waveforms. The RF waveforms are typically in a suitable range of frequencies, such as those near 900 MHz, 13.56 MHz, and so on.

The communication between reader and tag uses symbols, also called RFID symbols. A symbol can be a delimiter, a calibration value, and so on. Symbols can be implemented for exchanging binary data, such as "0" and "1", if that is desired. When symbols are processed by reader 110 and tag 120 they can be treated as values, numbers, and so on.

Tag 120 can be a passive tag, or an active or battery-assisted tag (i.e., a tag having its own power source). When tag 120 is a passive tag, it is powered from signal 112.

Figure 2:
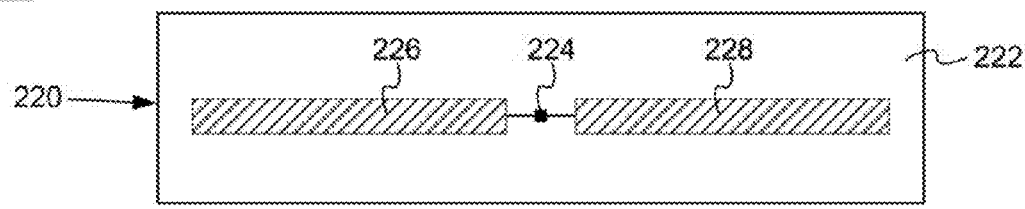
FIG. 2 is a diagram showing components of a passive RFID tag, such as a tag that can be used in the system of FIG. 1.
Figure 2:
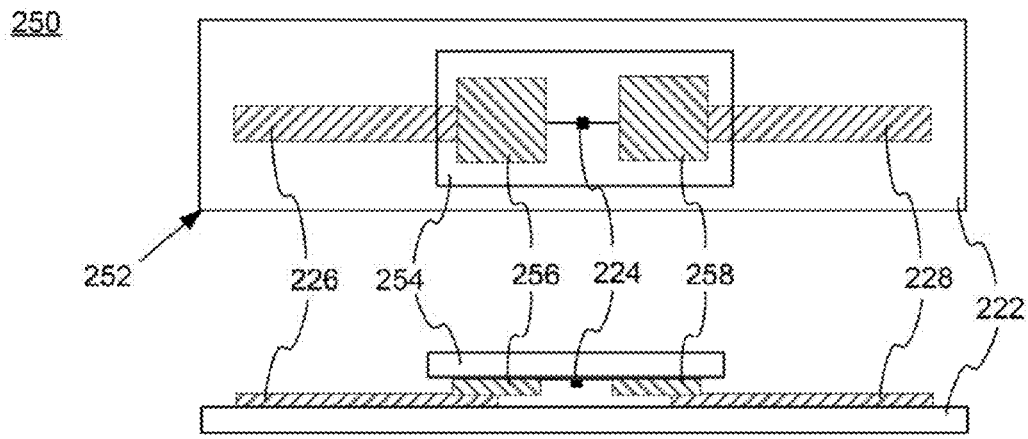
Figure 2:
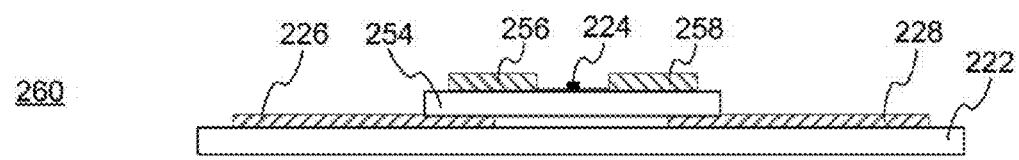

FIG. 2 is a diagram of an RFID tag 220, which may function as tag 120 of FIG. 1. Tag 220 is drawn as a passive tag, meaning it does not have its own power source. Much of what is described in this document, however, applies also to active and battery-assisted tags.

Tag 220 is typically (although not necessarily) formed on a substantially planar inlay 222, which can be made in many ways known in the art. Tag 220 includes a circuit which may be implemented as an IC 224. In some embodiments IC 224 is implemented in complementary metal-oxide semiconductor (CMOS) technology. In other embodiments IC 224 may be implemented in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for exchanging wireless signals with its environment. The antenna is often flat and attached to inlay 222. IC 224 is electrically coupled to the antenna via suitable IC contacts (not shown in FIG. 2). The term "electrically coupled" as used herein means that a low-impedance path exists between the electrically coupled components, and may mean the presence of a direct electrical connection or a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the term "electrically isolated" as used herein means that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling to a negligible level when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna receives a signal and communicates it to IC 224, which may both harvest power and respond if appropriate, based on the incoming signal and the IC's internal state. If IC 224 uses backscatter modulation then it responds by modulating the antenna's reflectance, which generates response signal 126 from signal 112 transmitted by the reader. Electrically coupling and uncoupling the IC contacts of IC 224 can modulate the antenna's reflectance, as can varying the admittance of a shunt-connected circuit element which is coupled to the IC contacts. Varying the impedance of a series-connected circuit element is another means of modulating the antenna's reflectance. If IC 224 is capable of transmitting signals (e.g., has its own power source, is coupled to an external power source, and/or is able to harvest sufficient power to transmit signals), then IC 224 may respond by transmitting response signal 126.

In the embodiments of FIG. 2, antenna segments 226 and 228 are separate from IC 224. In other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

An RFID tag such as tag 220 is often attached to or associated with an individual item or the item packaging. An RFID tag may be fabricated and then attached to the item or packaging, or may be partly fabricated before attachment to the item or packaging and then completely fabricated upon attachment to the item or packaging. In some embodiments, the manufacturing process of the item or packaging may include the fabrication of an RFID tag. In these embodiments, the resulting RFID tag may be integrated into the item or packaging, and portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication if tag 120 is configured to transmit signals as described above. Another such mode, suitable for passive tags, is called half-duplex, and is described below.

Figure 3:
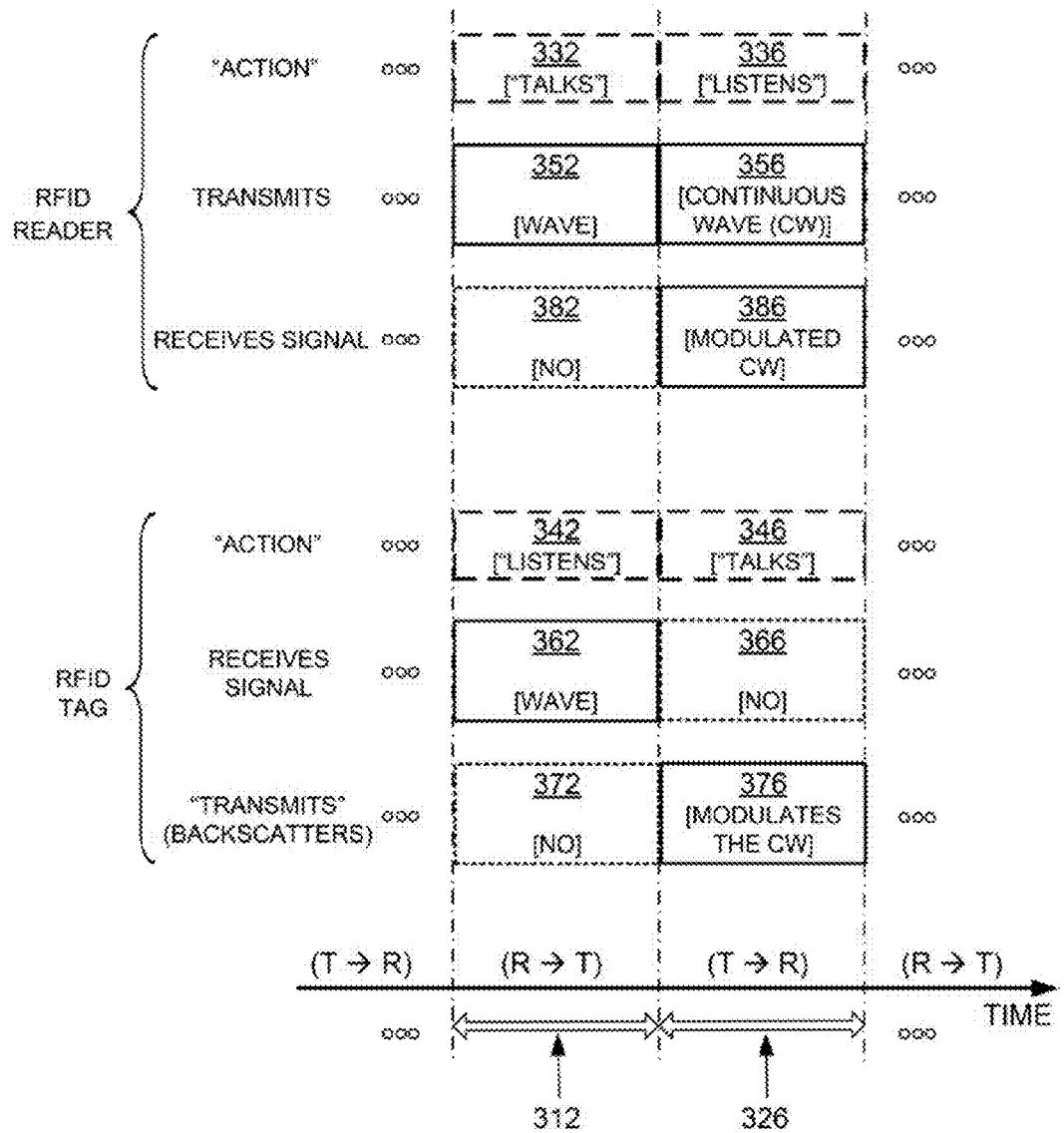
FIG. 3 is a conceptual diagram for explaining a half-duplex mode of communication between the components of the RFID system of FIG. 1.

FIG. 3 is a conceptual diagram 300 for explaining half-duplex communications between the components of the RFID system of FIG. 1, in this case with lag 120 implemented as passive tag 220 of FIG. 2. The explanation is made with reference to a TIME axis, and also to a human metaphor of "talking" and "listening". The actual technical implementations for "talking" and "listening" are now described.

RFID reader 110 and RFID tag 120 talk and listen to each other by taking turns. As seen on axis TIME, when reader 110 talks to tag 120 the communication session is designated as "R→T", and when tag 120 talks to reader 110 the communication session is designated as "T→R". Along the TIME axis, a sample R→T communication session occurs during a time interval 312, and a following sample T→R communication session occurs during a time interval 326. Interval 312 may typically be of a different duration than interval 326—here the durations are shown approximately equal only for purposes of illustration.

According to blocks 332 and 336, RFID reader 110 talks during interval 312, and listens during interval 326. According to blocks 342 and 346, RFID tag 120 listens while reader 110 talks (during interval 312), and talks while reader 110 listens (during interval 326).

In terms of actual behavior, during interval 312 reader 110 talks to tag 120 as follows. According to block 352, reader 110 transmits signal 112, which was first described in FIG. 1. At the same time, according to block 362, tag 120 receives signal 112 and processes it to extract data and so on. Meanwhile, according to block 372, tag 120 does not backscatter with its antenna, and according to block 382, reader 110 has no signal to receive from tag 120.

During interval 326, tag 120 talks to reader 110 as follows. According to block 356, reader 110 transmits a Continuous Wave (CW) signal, which can be thought of as a carrier that is typically not amplitude modulated or phase modulated and therefore encodes no information. This CW signal serves both to transfer energy to tag 120 for its own internal power needs, and also as a carrier that tag 120 can modulate with its backscatter. Indeed, during interval 326, according to block 366, tag 120 does not receive a signal for processing. Instead, according to block 376, tag 120 modulates the CW emitted according to block 356 so as to generate backscatter signal 126. Concurrently, according to block 386, reader 110 receives backscatter signal 126 and processes it.

Figure 4:
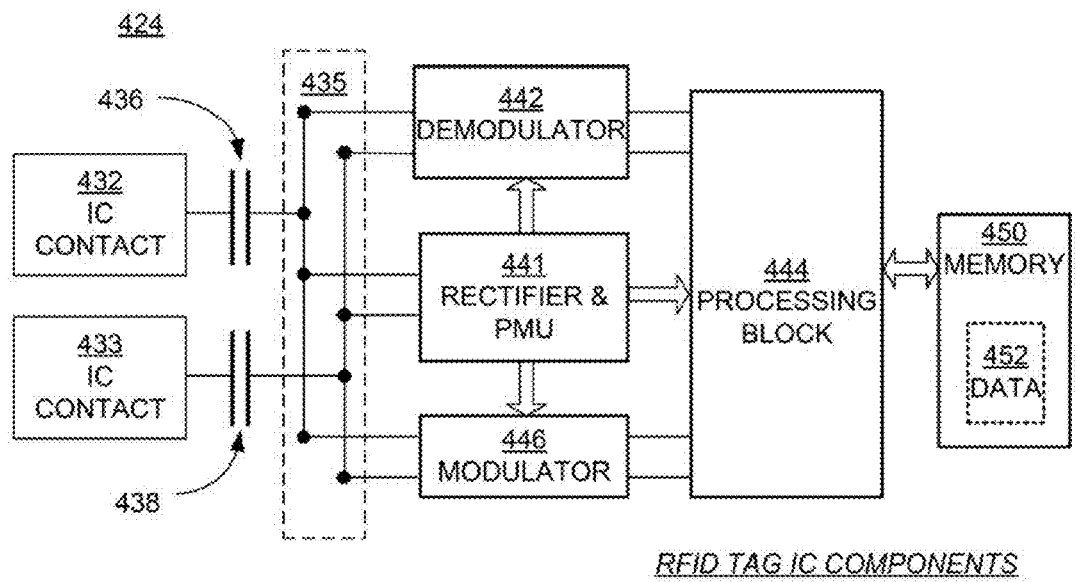
FIG. 4 is a block diagram showing a detail of an RFID IC.

FIG. 4 is a block diagram showing a detail of an RFID IC, such as IC 224 in FIG. 2. Electrical circuit 424 in FIG. 4 may be formed in an IC of an RFID tag, such as tag 220 of FIG. 2. Circuit 424 has a number of main components that are described in this document. Circuit 424 may have a number of additional components from what is shown and described, or different components, depending on the exact implementation.

Circuit 424 shows two IC contacts 432, 433, suitable for coupling to antenna segments such as antenna segments 226/228 of RFID tag 220 of FIG. 2. When two IC contacts form the signal input from and signal return to an antenna they are often referred-to as an antenna port. IC contacts 432, 433 may be made in any suitable way, such as from metallic pads and so on. In some embodiments circuit 424 uses more than two IC contacts, especially when tag 220 has more than one antenna port and/or more than one antenna.

Circuit 424 includes signal-routing section 435 which may include signal wiring, signal-routing busses, receive/transmit switches, and so on that can route a signal to the components of circuit 424. In some embodiments IC contacts 432/433 couple galvanically and/or inductively to signal-routing section 435. In other embodiments (such as is shown in FIG. 4) circuit 424 includes optional capacitors 436 and/or 438 which, if present, capacitively couple IC contacts 432/433 to signal-routing section 435. This capacitive coupling causes IC contacts 432/433 to be galvanically decoupled from signal-routing section 435 and other circuit components.

Capacitive coupling (and resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In this situation, capacitors 436 and/or 438 galvanically decouple IC contact 432 from IC contact 433, thereby preventing the formation of a short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 also includes a rectifier and PMU (Power Management Unit) 441 that harvests energy from the RF signal received by antenna segments 226/228 to power the circuits of IC 424 during either or both reader-to-tag (R→T) and tag-to-reader (T→R) sessions. Rectifier and PMU 441 may be implemented in any way known in the art.

Circuit 424 additionally includes a demodulator 442 that demodulates the RF signal received via IC contacts 432, 433. Demodulator 442 may be implemented in any way known in the art, for example including a slicer, an amplifier, and so on.

Circuit 424 further includes a processing block 444 that receives the output from demodulator 442 and performs operations such as command decoding, memory interfacing, and so on. In addition, processing block 444 may generate an output signal for transmission. Processing block 444 may be implemented in any way known in the art, for example by combinations of one or more of a processor, memory, decoder, encoder, and so on.

Circuit 424 additionally includes a modulator 446 that modulates an output signal generated by processing block 444. The modulated signal is transmitted by driving IC contacts 432, 433, and therefore driving the load presented by the coupled antenna segment or segments. Modulator 446 may be implemented in any way known in the art, for example including a switch, driver, amplifier, and so on.

In one embodiment, demodulator 442 and modulator 446 may be combined in a single transceiver circuit. In another embodiment modulator 446 may modulate a signal using backscatter. In another embodiment modulator 446 may include an active transmitter. In yet other embodiments demodulator 442 and modulator 446 may be part of processing block 444.

Circuit 424 additionally includes a memory 450 to store data 452. At least a portion of memory 450 is preferably implemented as a Nonvolatile Memory (NVM), which means that data 452 is retained even when circuit 424 does not have power, as is frequently the case for a passive RFID tag.

In some embodiments, particularly in those with more than one antenna port, circuit 424 may contain multiple demodulators, rectifiers, PMUs, modulators, processing blocks, and/or memories.

In terms of processing a signal, circuit 424 operates differently during a R→T session and a T→R session. The different operations are described below, in this case with circuit 424 representing an IC of an RFID tag.

Figure 5A:
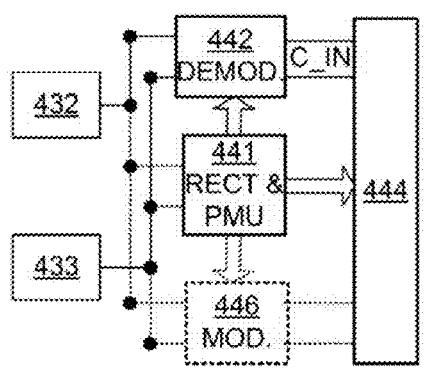
FIGS. 5A and 5B illustrate signal paths during tag-to-reader and reader-to-tag communications in the block diagram of FIG. 4.

FIG. 5A shows version 524-A of components of circuit 424 of FIG. 4, further modified to emphasize a signal operation during a R→T session during time interval 312 of FIG. 3. Demodulator 442 demodulates an RF signal received from IC contacts 432, 433. The demodulated signal is provided to processing block 444 as C_IN. In one embodiment, C_IN may include a received stream of symbols.

Version 524-A shows as relatively obscured those components that do not play a part in processing a signal during a R→T session. Rectifier and PMU 441 may be active, such as for converting RF power. Modulator 446 generally does not transmit during a R→T session, and typically does not interact with the received RF signal significantly, either because switching action in section 435 of FIG. 4 decouples modulator 446 from the RF signal, or by designing modulator 446 to have a suitable impedance, and so on.

Although modulator 446 is typically inactive during a R→T session, it need not be so. For example, during a R→T session modulator 446 could be adjusting its own parameters for operation in a future session, and so on.

Figure 5B:
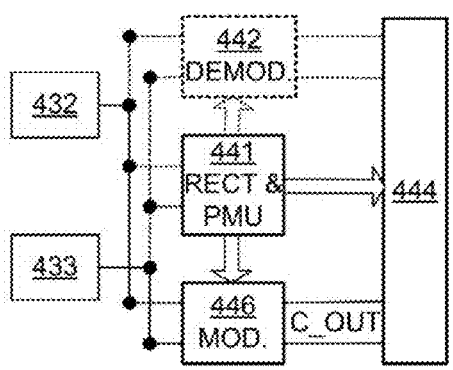

FIG. 5B shows version 524-B of components of circuit 424 of FIG. 4, further modified to emphasize a signal operation during a T→R session during time interval 326 of FIG. 3. Processing block 444 outputs a signal C_OUT. In one embodiment, C_OUT may include a stream of symbols for transmission. Modulator 446 then modulates C_OUT and provides it to antenna segments such as segments 226/228 of RFID tag 220 via IC contacts 432, 433.

Version 524-B shows as relatively obscured those components that do not play a part in processing a signal during a T→R session. Rectifier and PMU 441 may be active, such as for converting RF power. Demodulator 442 generally does not receive during a T→R session, and typically does not interact with the transmitted RF signal significantly, either because switching action in section 435 of FIG. 4 decouples demodulator 442 from the RF signal, or by designing demodulator 442 to have a suitable impedance, and so on.

Although demodulator 442 is typically inactive during a T→R session, it need not be so. For example, during a T→R session demodulator 442 could be adjusting its own parameters for operation in a future session, and so on.

In typical embodiments, demodulator 442 and modulator 446 are operable to demodulate and modulate signals according to a protocol, such as the Gen2 Specification mentioned above. In embodiments where circuit 424 includes multiple demodulators and/or modulators, each may be configured to support different protocols or different sets of protocols. A protocol specifies, in part, symbol encodings, and may include a set of modulations, rates, timings, or any other parameter associated with data communications. In addition, a protocol can be a variant of a stated specification such as the Gen2 Specification, for example including fewer or additional commands than the stated specification calls for, and so on. In such instances, additional commands are sometimes called custom commands.

Figure 6:
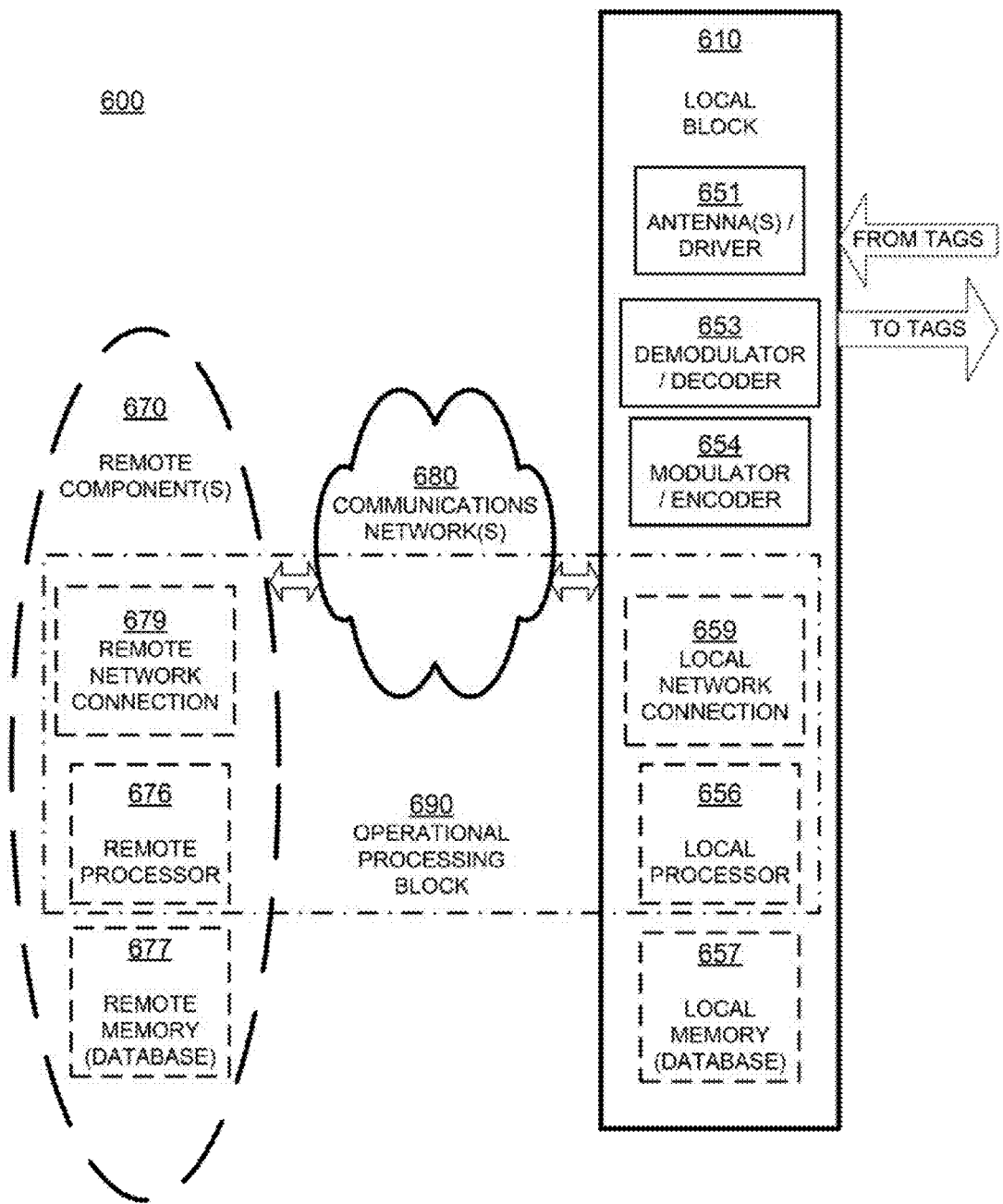
FIG. 6 is a block diagram of a whole RFID reader system according to embodiments.

FIG. 6 is a block diagram of an RFID reader system 600 according to embodiments. RFID reader system 600 includes a local block 610, and optionally remote components 670. Local block 610 and remote components 670 can be implemented in any number of ways. For example, local block 610 or portions of local block 610 may be implemented as a standalone device or as a component in another device. In some embodiments, local block 610 or portions of local block 610 may be implemented as a mobile device, such as a handheld RFID reader, or as a component in a mobile device, such as a laptop, tablet, smartphone, wearable device, or any other suitable mobile device. It will be recognized that RFID reader 110 of FIG. 1 is the same as local block 610, if remote components 670 are not provided. Alternately, RFID reader 110 can be implemented instead by RFID reader system 600, of which only the local block 610 is shown in FIG. 1.

In some embodiments, one or more of the blocks or components of reader system 600 may be implemented as integrated circuits. For example, local block 610, one or more of the components of local block 610, and/or one or more of the remote component 670 may be implemented as integrated circuits using CMOS technology, BJT technology, MESFET technology, and/or any other suitable implementation technology.

Local block 610 is responsible for communicating with RFID tags. Local block 610 includes a block 651 of an antenna and a driver of the antenna for communicating with the tags. Some readers, like that shown in local block 610, contain a single antenna and driver. Some readers contain multiple antennas and drivers and a method to switch signals among them, including sometimes using different antennas for transmitting and for receiving. Some readers contain multiple antennas and drivers that can operate simultaneously. In some embodiments, block 651 may be a phased-array antenna or synthesized-beam antenna (SBA), described in more detail below, and local block 610 may be implemented in a synthesized-beam reader (SBR) configured to generate one or more beams via the SBA. A demodulator/decoder block 653 demodulates and decodes backscattered waves received from the tags via antenna/driver block 651. Modulator/encoder block 654 encodes and modulates an RF wave that is to be transmitted to the tags via antenna/driver block 651.

Local block 610 additionally includes an optional local processor 656. Local processor 656 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer, programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases, some or all of the decoding function in block 653, the encoding function in block 654, or both, may be performed instead by local processor 656. In some cases local processor 656 may implement an encryption or authentication function; in some cases one or more of these functions can be distributed among other blocks such as encoding block 654, or may be entirely incorporated in another block.

Local block 610 additionally includes an optional local memory 657. Local memory 657 may be implemented in any number of ways known in the art, including, by way of example and not of limitation, any of the memory types described above as well as any combination thereof. Local memory 657 can be implemented separately from local processor 656, or in an IC with local processor 656, with or without other components. Local memory 657, if provided, can store programs for local processor 656 to run, if needed.

In some embodiments, local memory 657 stores data read from tags, or data to be written to tags, such as Electronic Product Codes (EPCs), Tag Identifiers (TIDs) and other data. Local memory 657 can also include reference data that is to be compared to EPCs, instructions and/or rules for how to encode commands for the tags, modes for controlling antenna 651, encryption/authentication algorithms, algorithms for tracking tag location or movement, secret keys, key pairs, individual public and/or private keys, electronic signatures, and so on. In some of these embodiments, local memory 657 is provided as a database.

Some components of local block 610 typically treat the data as analog, such as the antenna/driver block 651. Other components such as local memory 657 typically treat the data as digital. At some point there is a conversion between analog and digital. Based on where this conversion occurs, a reader may be characterized as "analog" or "digital", but most readers contain a mix of analog and digital functionality.

If remote components 670 are provided, they are coupled to local block 610 via an electronic communications network 680. Network 680 can be a Local Area Network (LAN), a Metropolitan Area Network (MAN), a Wide Area Network (WAN), a network of networks such as the internet, or a local communication link, such as a USB, PCI, and so on. Local block 610 may include a local network connection 659 for communicating with communications network 680 or may couple to a separate device or component configured to communicate with communications network 680. Communications on the network can be secure, such as if they are encrypted or physically protected, or insecure if they are not encrypted or otherwise protected.

There can be one or more remote component(s) 670. If more than one, they can be located at the same location, or in different locations. They may communicate with each other and local block 610 via communications network 680, or via other similar networks, and so on. Accordingly, remote component(s) 670 can use respective remote network connections. Only one such remote network connection 679 is shown, which is similar to local network connection 659, etc.

Remote component(s) 670 can also include a remote processor 676. Remote processor 676 can be made in any way known in the art, such as was described with reference to local processor 656. Remote processor 676 may also implement an encryption/authentication function and/or a tag location/tracking function, similar to local processor 656.

Remote component(s) 670 can also include a remote memory 677. Remote memory 677 can be made in any way known in the art, such as was described with reference to local memory 657. Remote memory 677 may include a local database, and a different database of a standards organization, such as one that can reference EPCs. Remote memory 677 may also contain information associated with commands, tag profiles, keys, or the like, similar to local memory 657.

One or more of the above-described elements may be combined and designated as operational processing block 690. Operational processing block 690 includes those components that are provided of the following: local processor 656, remote processor 676, local network connection 659, remote network connection 679, and by extension an applicable portion of communications network 680 that links remote network connection 679 with local network connection 659. The portion can be dynamically changeable, etc. In addition, operational processing block 690 can receive and decode RF waves received via antenna/driver 651, and cause antenna/driver 651 to transmit RF waves according to what it has processed.

Operational processing block 690 includes either local processor 656, or remote processor 676, or both. If both are provided, remote processor 676 can be made such that it operates in a way complementary with that of local processor 656. In fact, the two can cooperate. It will be appreciated that operational processing block 690, as defined this way, is in communication with both local memory 657 and remote memory 677, if both are present.

Accordingly, operational processing block 690 is location independent, in that its functions can be implemented either by local processor 656, or by remote processor 676, or by a combination of both. Some of these functions are preferably implemented by local processor 656, and some by remote processor 676. Operational processing block 690 accesses local memory 657, or remote memory 677, or both for storing and/or retrieving data.

RFID reader system 600 operates by operational processing block 690 generating communications for RFID tags. These communications are ultimately transmitted by antenna/driver block 651, with modulator/encoder block 654 encoding and modulating the information on an RF wave. Then data is received from the tags via antenna/driver block 651, demodulated and decoded by demodulator/decoder block 653, and processed by operational processing block 690.

Embodiments of an RFID reader system can be implemented as hardware, software, firmware, or any combination. Such a system may be subdivided into components or modules. Some of these components or modules can be implemented as hardware, some as software, some as firmware, and some as a combination. An example of such a subdivision is now described, together with the RFID tag as an additional module.

Figure 7:
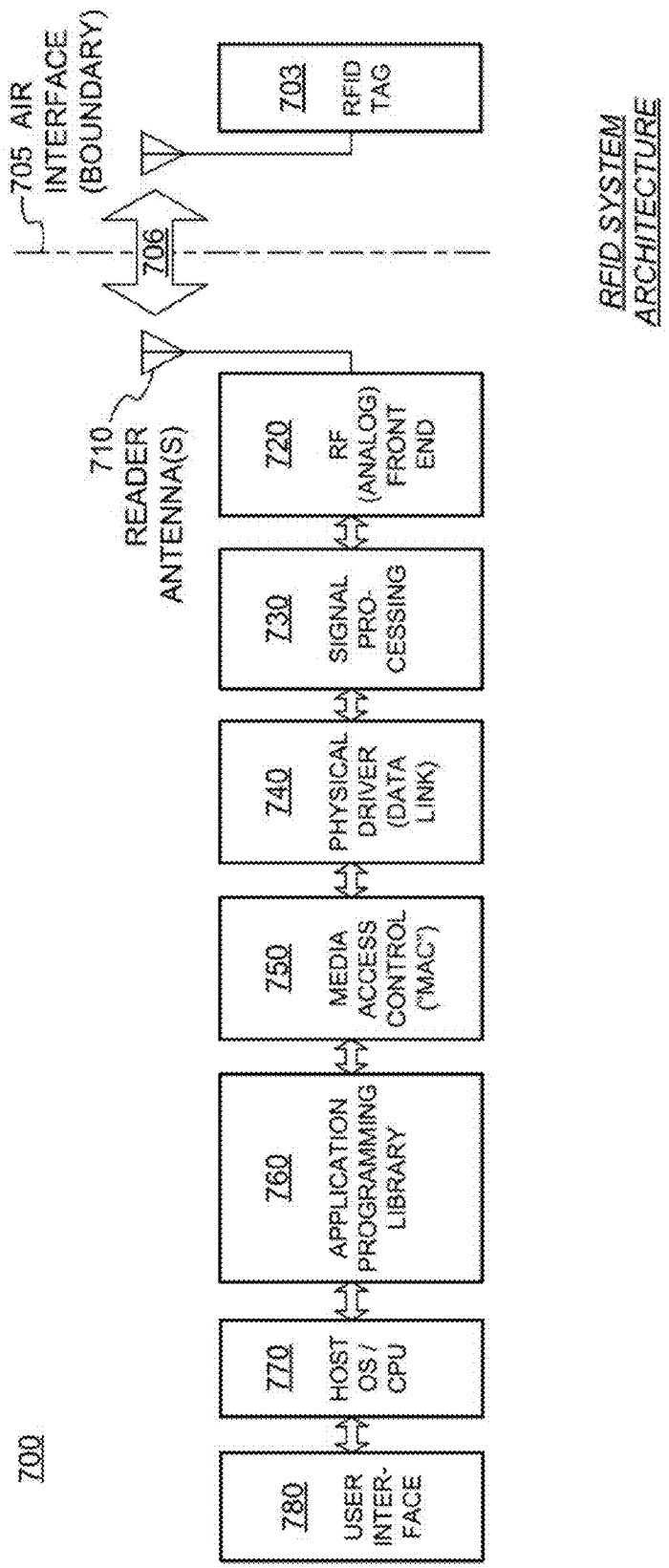
FIG. 7 is a block diagram illustrating an overall architecture of an RFID system according to embodiments.

FIG. 7 is a block diagram illustrating an overall architecture of an RFID system 700 according to embodiments. RFID system 700 may be subdivided into modules or components, each of which may be implemented by itself or in combination with others. In addition, some of them may be present more than once. Other embodiments may be equivalently subdivided into different modules. Some aspects of FIG. 7 are parallel with systems, modules, and components described previously.

An RFID tag 703 is considered here as a module by itself. RFID tag 703 conducts a wireless communication 706 with the remainder, via the air interface 705. Air interface 705 is really a boundary, in that signals or data that pass through it are not intended to be transformed from one thing to another. Specifications as to how readers and tags are to communicate with each other, for example the Gen2 Specification, also properly characterize that boundary as an interface.

RFID system 700 includes one or more reader antennas 710, and an RF front-end module 720 for interfacing with reader antenna(s) 710. These can be made as described above.

RFID system 700 also includes a signal-processing module 730. In one embodiment, signal-processing module 730 exchanges waveforms with RF front-end module 720, such as I and Q waveform pairs.

RFID system 700 further includes a physical-driver module 740, which is also known as a data-link module. In some embodiments physical-driver module 740 exchanges bits with signal-processing module 730. Physical-driver module 740 can be the stage associated with the framing of data.

RFID system 700 additionally includes a media access control module 750. In one embodiment, media access control layer module 750 exchanges packets of bits with physical driver module 740. Media access control layer module 750 can make decisions for sharing the medium of wireless communication, which in this case is the air interface.

RFID system 700 moreover includes an application-programming library-module 760. This module 760 can include application programming interfaces (APIs), other objects, etc.

All of these RFID system functionalities can be supported by one or more processors. One of these processors can be considered a host processor. Such a host processor might include a host operating system (OS) and/or central processing unit (CPU), as in module 770. In some embodiments, the processor is not considered as a separate module, but one that includes some of the above-mentioned modules of RFID system 700. In some embodiments the one or more processors may perform operations associated with retrieving data that may include a tag public key, an electronic signature, a tag identifier, an item identifier, and/or a signing-authority public key. In some embodiments the one or more processors may verify an electronic signature, create a tag challenge, and/or verify a tag response.

User interface module 780 may be coupled to application-programming-library module 760, for accessing the APIs. User interface module 780 can be manual, automatic, or both. It can be supported by the host OS/CPU module 770 mentioned above, or by a separate processor, etc.

It will be observed that the modules of RFID system 700 form a chain. Adjacent modules in the chain can be coupled by appropriate instrumentalities for exchanging signals. These instrumentalities include conductors, buses, interfaces, and so on. These instrumentalities can be local, e.g. to connect modules that are physically close to each other, or over a network, for remote communication.

The chain is used in one direction for receiving RFID waveforms and in the other direction for transmitting RFID waveforms. In receiving mode, reader antenna(s) 710 receives wireless waves, which are in turn processed successively by the various modules in the chain. Processing can terminate in any one of the modules. In transmitting mode, waveform initiation can be in any one of the modules. Ultimately, signals are routed to reader antenna(s) 710 to be transmitted as wireless waves.

The architecture of RFID system 700 is presented for purposes of explanation, and not of limitation. Its particular, subdivision into modules need not be followed for creating embodiments. Furthermore, the features of the present disclosure can be performed either within a single one of the modules, or by a combination of them. In some embodiments RFID system 700 can be incorporated into another electronic device such as a checkout terminal in a store or a consumer device such as a mobile phone.

Figure 8:
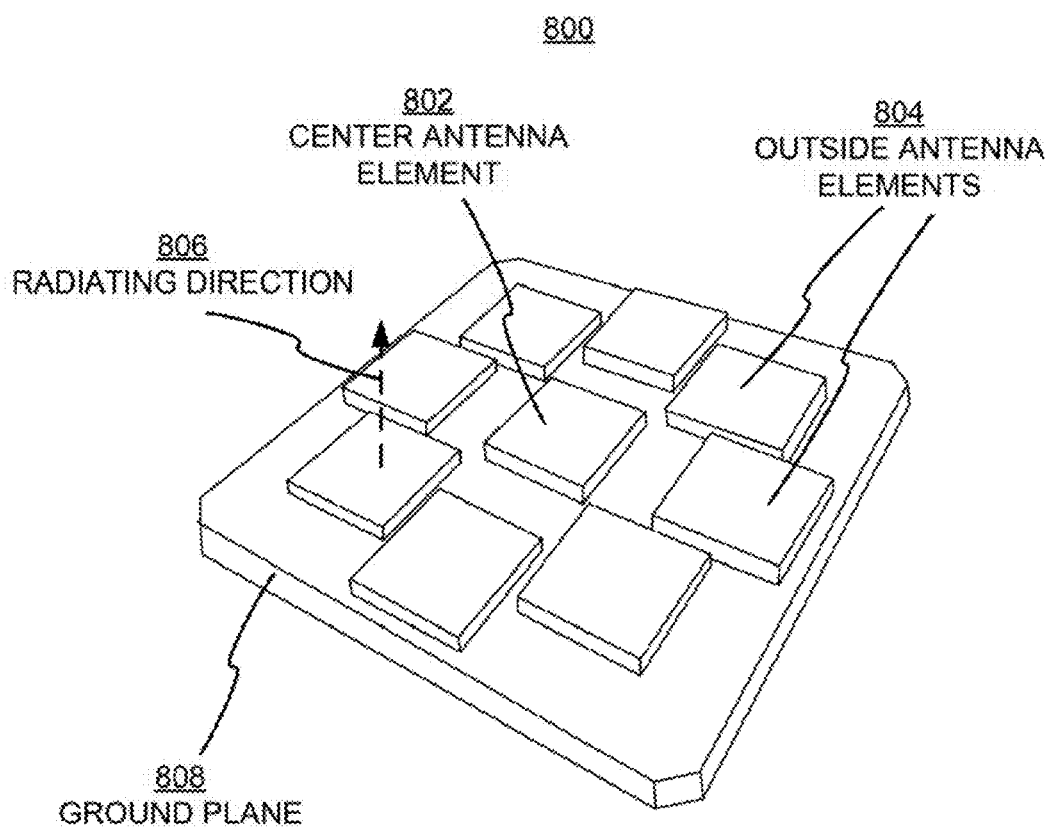
FIG. 8 depicts a discrete-element antenna array according to embodiments.

One or more RFID readers, or distributed portions of one or more readers, may be coupled to or embedded within an antenna array to form a synthesized-beam reader (SBR) capable of generating multiple RF beams, as described above. FIG. 8 depicts a perspective view of an antenna array 800 with discrete radiating elements according to embodiments. Antenna array 800 includes an array of antenna elements 802 and 804, and a ground plane 808 behind elements 802 and 804. Each element has a radiating direction vector 806 (only shown for one element) that is typically, but not necessarily, perpendicular to the ground plane. An RF radiation pattern (or "beam") for receiving or transmitting an RF signal may be synthesized by adjusting the amplitude and/or phase of the signals coupled from/to each antenna element 802 and 804. The orientation or direction of the synthesized beam (typically represented by the direction of the beam's primary lobe—the lobe having the highest radiated power) is controlled by these various amplitude and/or phase adjustments. The adjustments may be analog, digital, or a mix of analog and digital. For example, during transmission, an SBR may generate the signal to be transmitted and then direct the generated signal to elements 802 and 804 with different amplitudes and phases. Alternatively, the SBR may synthesize the different signals for each antenna element digitally and then convert the digital signals to analog. For example, each antenna element can be implemented as a separate digital transceiver having its own analog front end. Control signals to generate a beam can then be supplied to the different digital transceivers, each of which converts a digital signal into an analog signal for transmission. When the digital transceivers transmit their analog signals, the signals combine to form the synthesized beam. In other embodiments the SBR may use a mix of these approaches. Similarly, during a receive operation the SBR may combine analog signals after appropriate phase shifting and amplitude adjustment of each, or it may digitize the signals from each element and combine them digitally, or a mix thereof.

The antenna elements of SBA 800 may be one or more of patch, slot, wire, horn, helical, distributed, or any other type as will be known to those skilled in the art. Whereas FIG. 8 only shows nine antenna elements, antenna arrays with any number of antenna elements may be used, including a single distributed element or an element made from metamaterials. In some embodiments ground plane 808 may be nonplanar (e.g., curved, concave, convex, etc.) and in other embodiments need not exist.

Figure 9A:
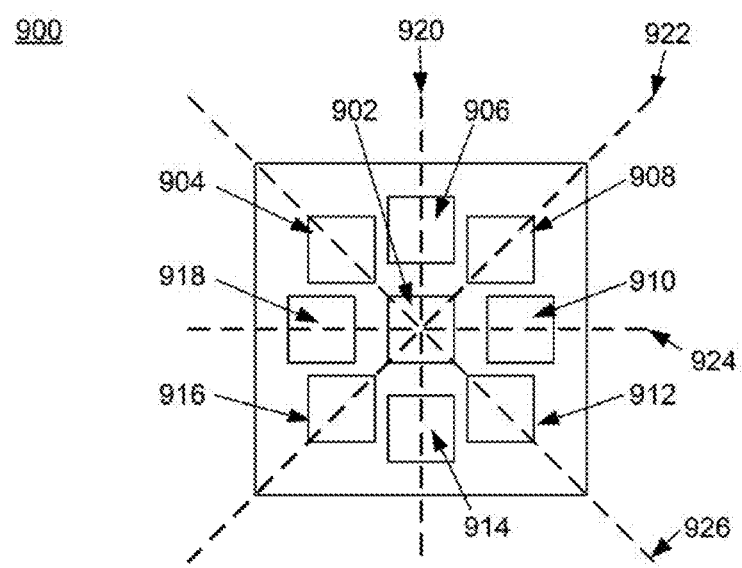
FIGS. 9A and 9B depict the antenna array of FIG. 8 synthesizing a beam in different physical directions, according to embodiments.
Figure 9B:
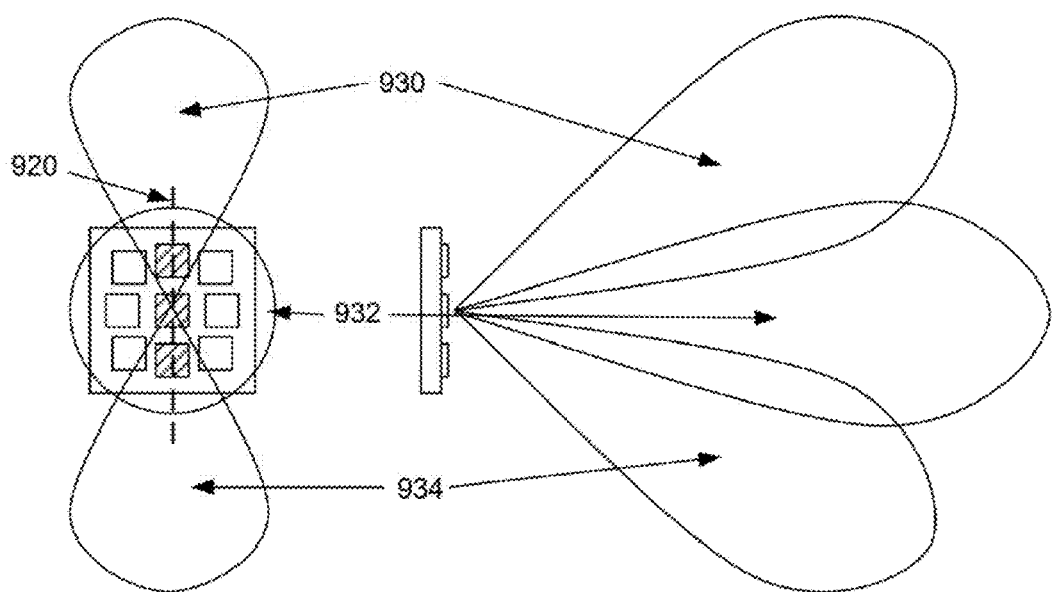

FIGS. 9A and 9B show the orientations of some of the RF beams that SBA 900, similar to SBA 800 in FIG. 8, can generate. SBA 900 has nine antenna elements 902-918, with element 902 at the center and elements 904-918 around it. The shape and direction of the beam that SBA 900 generates depends on the signals to/from each element. Suppose that SBR 900 transmits using primarily elements 902, 906, and 914. Then, depending on the amplitude and phase of the signals applied to these elements, SBA 900 can change the orientation of a beam (also referred to as "steering" the beam) along the direction indicated by dashed line 920. In a similar fashion, suppose that SBR 900 transmits primarily using elements 902, 908, and 916. Then, depending on the amplitude and phase of the signals applied to these elements, SBA 900 can steer a beam along the direction indicated by dashed line 922. Of course, other steering arrangements are possible, including using all 9 elements to transmit and/or receive in arbitrary directions and to generate narrow beams.

FIG. 9B shows how RF beams with different directions can be synthesized using antenna elements located along line 920, with the diagram to the left depicting a head-on view similar to FIG. 9A and the diagram to the right depicting a side view. As described above, the beam direction can be controlled by varying the amplitude and phase of the signals to/from the antenna elements. For example, by applying a leading signal phase to element 906, an intermediate signal phase to element 902, and a trailing signal phase to element 914, the SBA will tend to steer its beam downward as in beam 934. Switching leading and lagging from elements 906/902 to elements 902/906 will tend to steer the beam upwards as in beam 930. Of course, the actual beam shape depends on both the magnitude of the phase shifting and the magnitude of the amplitude scaling (if any).

Figure 10:
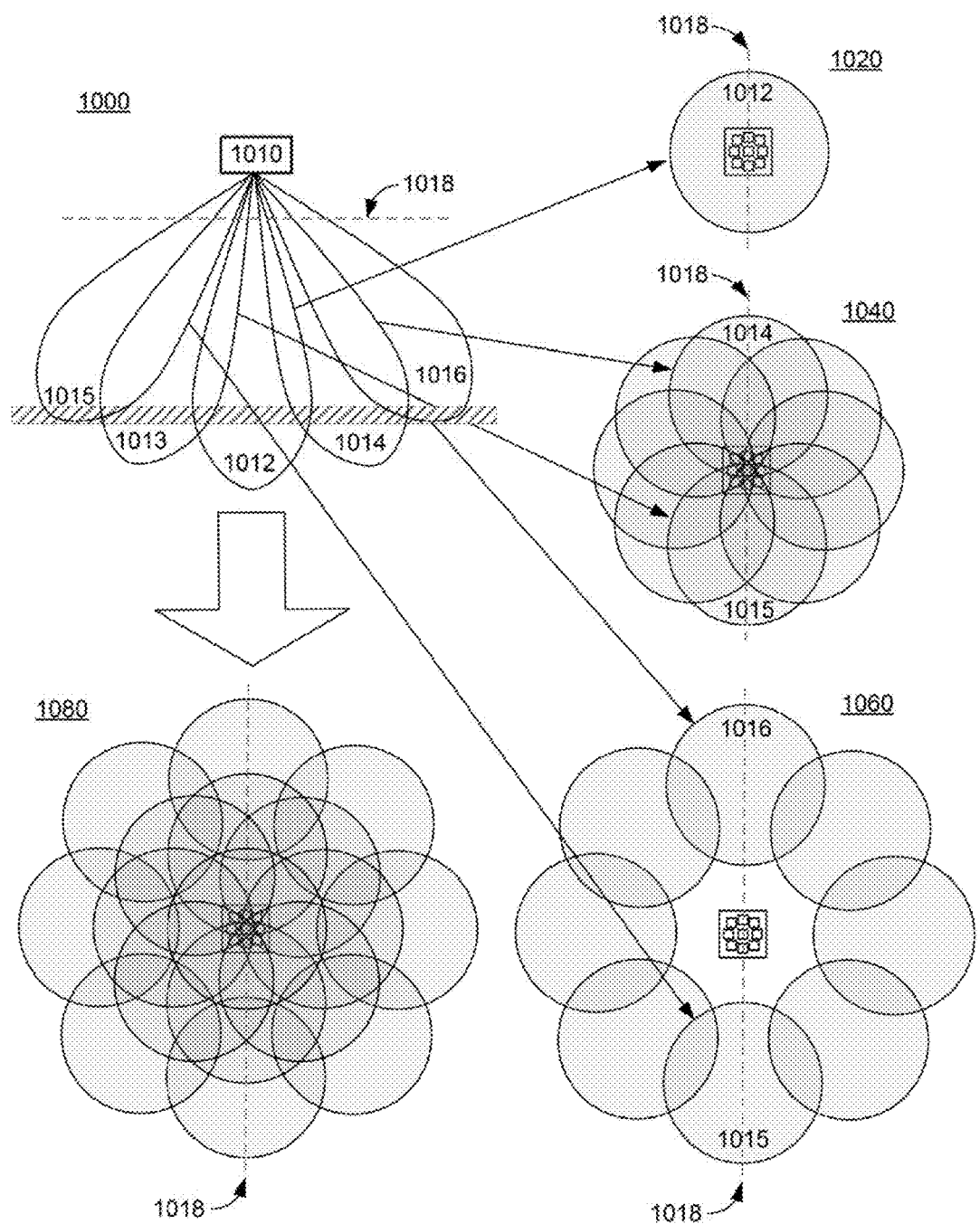
FIG. 10 depicts some of the potential beam locations that can be synthesized by the antenna array of FIG. 8, according to embodiments.

FIG. 10 depicts potential beams from an SBR according to embodiments. Diagram 1000 depicts a side perspective of SBR 1010, capable of synthesizing at least five different RF beams 1012, 1013, 1014, 1015, and 1016, arranged along line 1018 (similar to line 920 in FIG. 9A), with each RF beam pointed in a different direction.

A beam can be characterized by one or more longitudinal beam cross-sections as depicted in diagram 1000 (that is, cross-sections of the beam in one or more planes parallel to the beam direction) and/or perpendicular beam cross-sections (that is, cross-sections of the beam in one or more planes perpendicular to the beam direction). A beam can also be characterized by a beam length indicative of the power distribution of the beam along the beam direction, a beam width indicative of the power distribution of the beam in a direction perpendicular to the beam direction, and/or any other suitable shape-based parameter. Beam shapes may be based on, for example, the type of antenna used, the RF frequency of the beam, the power used to generate the beam, and/or how the beam is transmitted. In synthesized-beam embodiments, the beam illumination may be based on the arrangement of excited antenna elements and the amplitude, phase, and/or frequency of the various signals used to excite the antenna elements.

Diagrams 1020, 1040, 1060, and 1080 depict example coverage areas, shown as shaded circles, of the beam patterns generated by SBR 1010, A beam generated by an SBR has a coverage volume, also known as the beam's "field-of-view (FoV)", which is a volume in three-dimensional space where, during transmission, the transmitted energy density exceeds a threshold, and where, during receiving, the received energy density exceeds a threshold. A beam's coverage area is a projection of the beam's FoV on a surface. The FoV and coverage area may be different during transmit and receive, and may vary with reader or tag power, the thresholds, the distance between the SBR and the surface, and other parameters. For example, a beam may have different FoVs and therefore coverage areas based on the threshold(s) selected for transmitted and/or received energy densities.

Diagram 1020 depicts an example coverage area of central beam 1012. Diagram 1040 depicts example coverage areas of the inner beams such as 1014 and 1015. Diagram 1060 depicts example coverage areas of the outer beams such as 1015 and 1016. Finally, diagram 1080 depicts an example total coverage area of all the beams formed by SBR 1010. As shown in diagrams 1020-1080, beam coverage areas may overlap. For example, inner beam 1014 may overlap with the central beam 1012, with one or more other inner beams, and with one or more other outer beams.

Whereas SBR 1010 is depicted as being able to generate and switch between five beams on an axis (e.g., axis 1018), in other embodiments an SBR may generate and switch between more or fewer beams on any given axis. Similarly, whereas SBR 1010 is depicted as being able to generate beams on four different axes (e.g., axes 920, 922, 924, and 926 in FIG. 9A), in other embodiments an SBR may be configured to generate beams on more or fewer axes. An individual beam's coverage area in FIG. 10 and subsequent figures is depicted as circular for simplicity, and in actuality may be of any suitable shape, and may vary based on interactions between the different elements that form the beam, as well as the orientation and topology of the surface on which the coverage area is projected. For example, a beam may have a non-circular coverage area. As another example, a circular beam that illuminates a surface with a non-perpendicular angle may project an elliptical coverage area on the surface.

Figure 11:
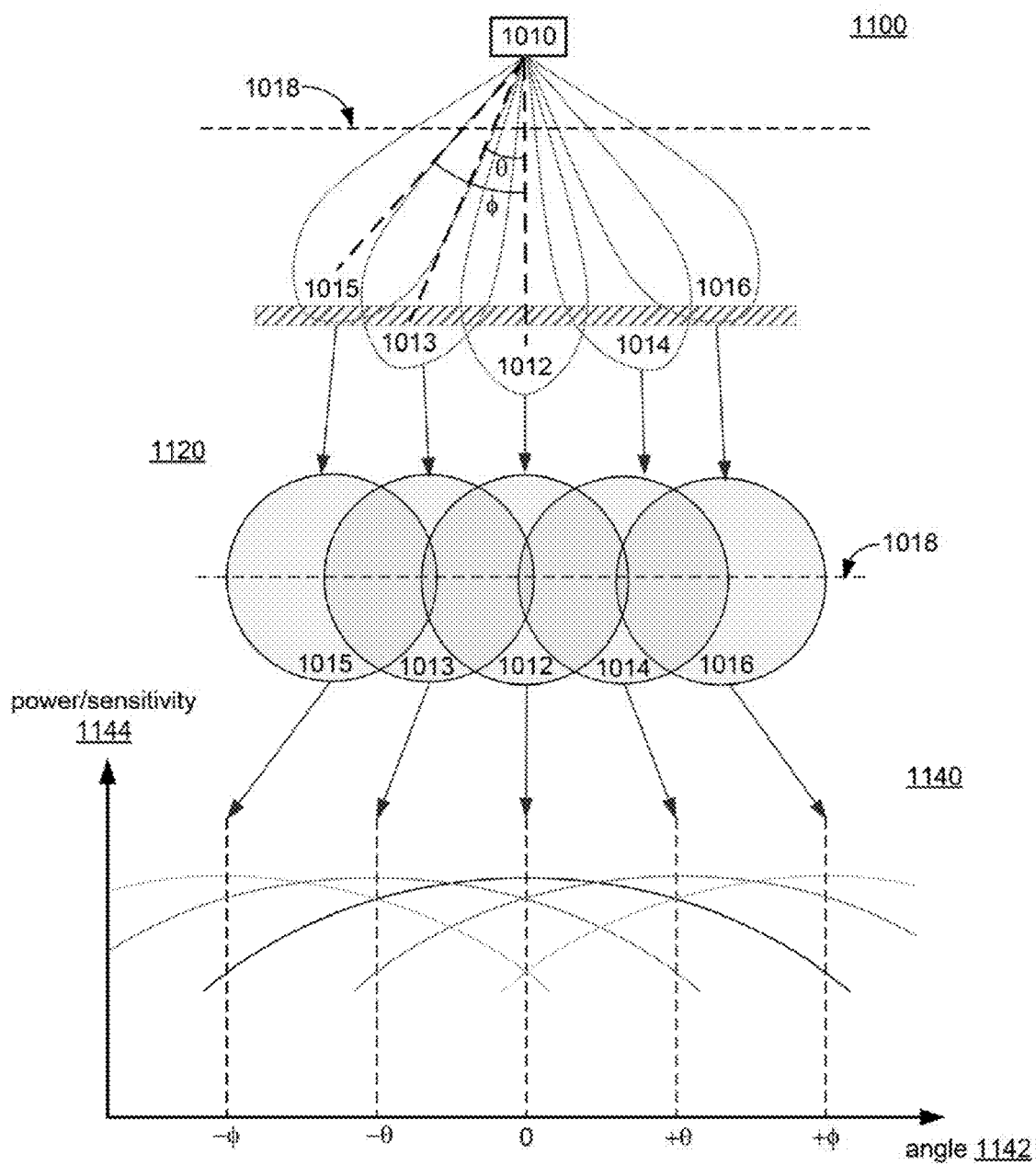
FIG. 11 depicts radiated beam power as a function of beam angle for a subset of the potential beams of the antenna array of FIG. 8.

FIG. 11 depicts receive sensitivity or beam power as a function of beam angle for a subset of the potential beams of the SBR of FIG. 10. Sensitivity indicates the ease with which a receiver (reader or tag) can recover an incident waveform, and can be measured in terms of power. Diagram 1100 is similar to diagram 1000, with similarly numbered elements behaving similarly. Diagram 1120 depicts a view of the overlapping areas of coverage of beams 1012, 1013, 1014, 1015, and 1016, all lying along axis 1018. Chart 1140 plots receive sensitivity or beam power as a function of beam angle. Each of the beams 1012-1016 is oriented at a particular angle, with beam 1012 oriented perpendicular to the plane of SBR 1010, beams 1013/1014 oriented at an angle θ from beam 1012, and beams 1015/1016 oriented at an angle φ from beam 1012. These angles are mapped on the horizontal axis 1142 of chart 1140. The vertical axis 1144 may represent either beam sensitivity or delivered power (or both), with sensitivity/power decreasing away from the origin. Each of the beams 1012-1016 has a sensitivity/power contour depicted as an arc in chart 1140 with a maximum at the beam's pointing angle. The contours define three-dimensional surfaces for which the receive sensitivity, beam power, or both, have a constant value. If we consider just beam power, as the tag's position moves away from the beam's pointing angle, the power decreases, reducing the beam's ability to power the tag. Alternatively, the power contour can represent the minimum power needed to power the RFID tag, and the curves in the beam's contour can represent the reduction in read range as the tag moves away from the beam's pointing angle. Of course, beam sensitivity/power may vary with beam RF frequency, tag sensitivity, desired tag operation, or myriad other RFID parameters as will be known to those skilled in the art.

Figure 12:
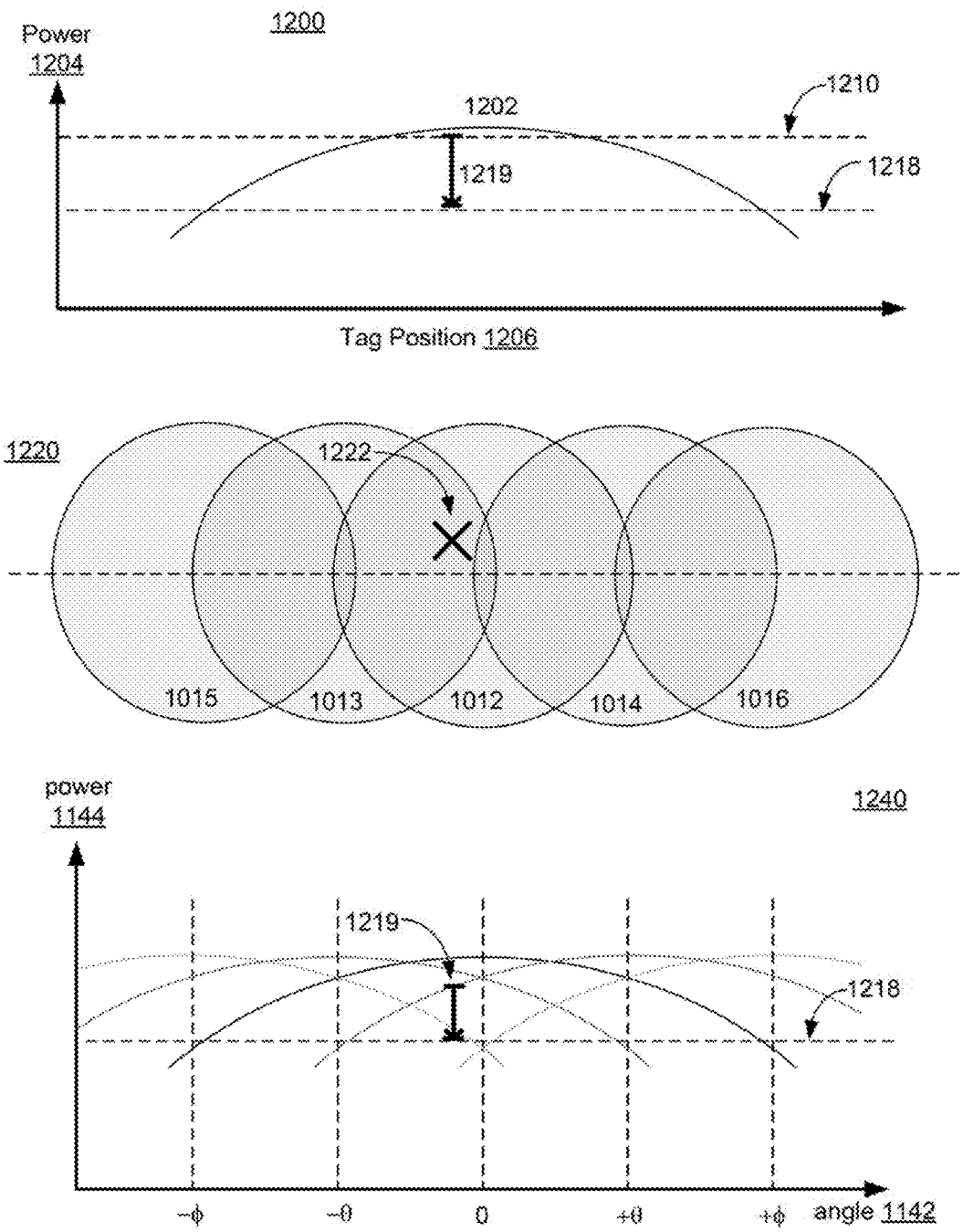
FIG. 12 depicts an RFID tag located in the subset of the potential beams of FIG. 11.

FIG. 12 is a diagram depicting an RFID tag located such that it is illuminated by a subset of the beams of FIG. 11. Chart 1200 plots beam power 1202 available to power the tag from beam 1012. Horizontal axis 1206 represents position and vertical axis 1204 power. A tag's ability to extract power from an incident RF wave varies with RF frequency, for many reasons, including the fact that a tag antenna is typically more sensitive at certain frequencies than others. Line 1210 represents the power an incident RF wave at the worst-case (i.e. least sensitive) RF frequency must have in order for the tag to operate, and line 1222 represents the power an incident RF wave at the best-case (i.e. most sensitive) RF frequency must have in order for the tag to operate. The tag is able to operate at all physical locations and RF frequencies for which curve 1202 lies above line 1210, and is able to operate at all physical locations and the best-case RF frequency for which curve 1202 lies above line 1218. In other words, the intersection points of curve 1202 and line 1210, when extended to a multi-dimensional space, bound a beam region in which the tag is able to operate at all RF frequencies, and the intersection points of curve 1202 and line 1218, when extended to a multi-dimensional space, bound a beam region in which the tag is able to operate at the best-case RF frequency. Of course, there exist a continuum of lines between 1210 and 1218, representing the continuum of RF frequencies between best and worst case, and a corresponding continuum of bound beam regions representing different regions in which the tag can operate. This continuum of frequencies is represented by tag operating profile 1219.

Diagrams 1220 and 1240 are similar to diagrams 1120 and 1140, with similarly numbered elements behaving similarly. Diagram 1240 is similar to diagram 1200, but with tag position converted from physical position to beam pointing angle. Tag 1222, shown with an "X" in diagram 1220 and 1240, is located where multiple beams overlap, and can be powered by a beam when the beam's power contour lies above line 1218 for the tag's best-case operating frequency. Line 1210 is not shown in diagram 1240 for reasons of clarity, but tag operating profile 1219 shows the range of power levels at various frequencies for which the tag is able to operate. It is clear that some beams can power the tag at all frequencies; some beams at some frequencies; and some beams at no frequencies. Moreover, it is clear that a tag's location with respect to a beam's area-of-coverage affects whether the tag can be powered by the beam. For example, tag 1222 lies near the center of beam 1012's area-of-coverage, and accordingly beam 1012 can power tag 1222 over all RF frequencies. In contrast, tag 1222 is relatively far from the center of beam 1015's area-of-coverage, and accordingly beam 1015 can only power tag 1222 over a few RF frequencies, if any at all.

Figure 13:
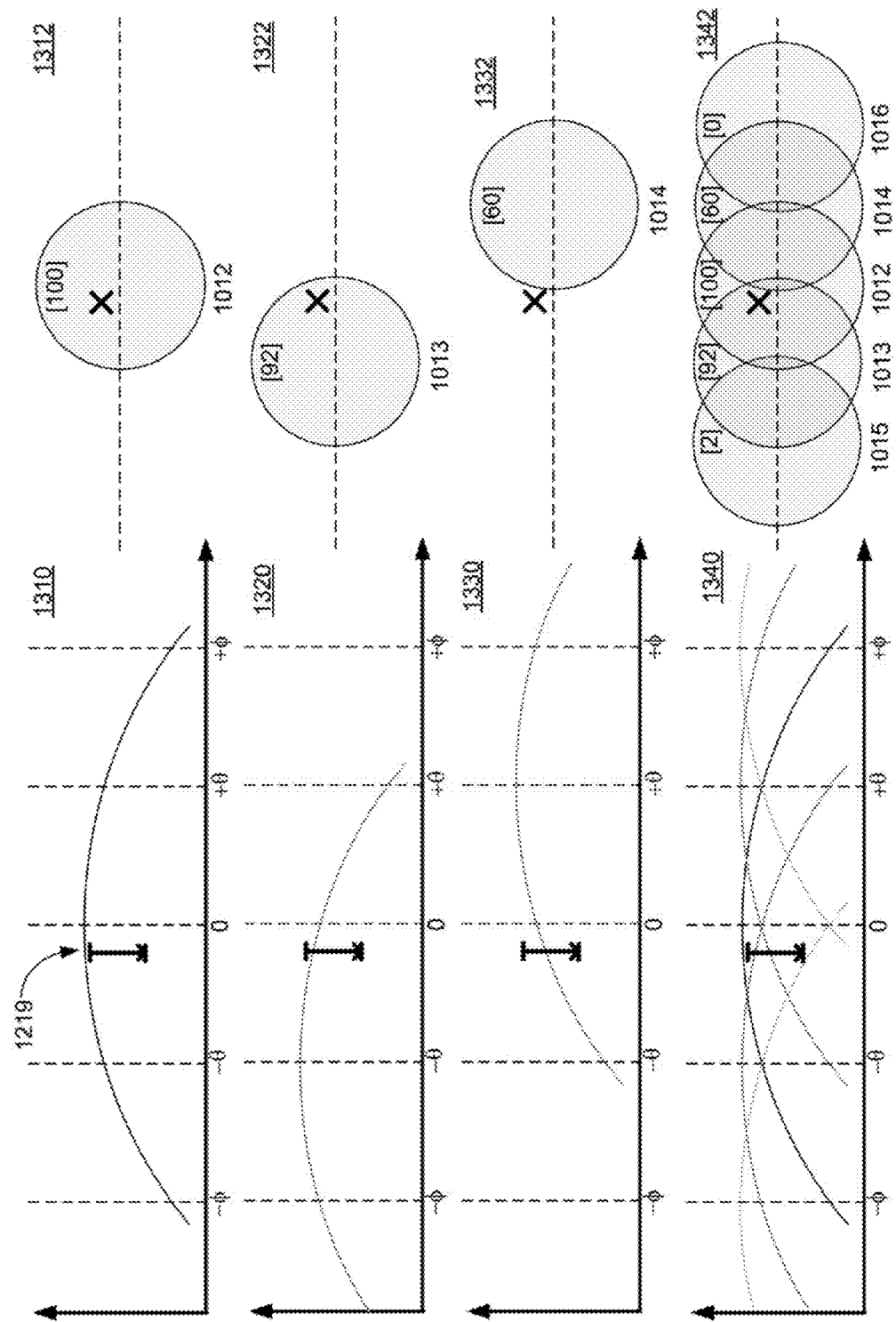
FIG. 13 depicts how the location of the RFID tag of FIG. 12 can be determined using tag response rates.

The relationship between whether a beam can power a tag and the distance between the beam's center (alternatively, the beam's target location) and the tag can be used to estimate the tag's location. FIG. 13 depicts how the location of the RFID tag 1222 of FIG. 12 can be determined using tag response rates. FIG. 13 includes a series of charts (1310, 1320, 1330, and 1340) and area-of-coverage diagrams (1312, 1322, 1332, and 1342) of the subset of potential beams of FIG. 12. Tag 1222 is represented as an "X" in the area-of-coverage diagrams, and tag operating profile 1219 shows the range of power levels at various RF frequencies for which the tag is able to operate.

Consider diagrams 1310 and 1312, which depict beam 1012 interacting with tag 1222. Tag 1222 is relatively centered within beam 1012's area of coverage. As a result, the entire tag operating profile 1219 lies within the contour of beam 1012, and the tag is able to operate regardless of beam 1012's RF frequency. As a result, when the SBR transmits interrogating signals on beam 1012 on multiple RF frequencies, the SBR will receive responses from tag 1222 at each frequency, resulting in a 100% response rate with frequency, depicted as "[100]" in diagram 1312. A tag's response rate is representative of the number of responses received from a tag over some other parameter. For example, a tag's response rate may be a ratio of the count of responses from the tag received on a beam to the number of interrogating signals transmitted on the beam, or may be a ratio of the tag's response count to a period of time over which interrogating signals were transmitted. In some embodiments, tag response rates may be based on inventory cycles, as described in commonly-assigned U.S. patent application Ser. No. 15/201,231 filed on Jul. 1, 2016, hereby incorporated by reference in its entirety.

Turning now to beam 1013, notice that tag 1222 is farther from the center of beam 1013 than from the center of beam 1012. As a result, the tag operating profile 1219 exceeds beam 1013's power for a small subset of frequencies, whereas the tag operating profile 1219 did not exceed beam 1012's power for any frequencies. Accordingly, when the SBR transmits interrogating signals on beam 1013 on multiple RF frequencies, the SBR will receive responses from tag 1222 at only a subset of frequencies. This result in a 92% response rate with frequency for beam 1013, depicted as "[92]" in diagram 1322, which is lower than the response rate with frequency for beam 1012.

Turning to beam 1014, notice that tag 1222 is even farther from the center of beam 1014 than the centers of beams 1012 and 1013, which means that tag operating profile 1219 exceeds beam 1013's power for an even larger subset of frequencies. As a result, when the SBR transmits interrogating signals on beam 1014 on multiple frequencies, the SBR will receive responses from tag 1222 over an even smaller subset of frequencies, resulting in a 60% response rate with frequency, depicted as "[60]" in diagram 1332, lower than the response rates for beams 1012 and 1013.

Finally, diagrams 1340 and 1342 depict how each of the five beams 1012-1016 may interact with tag 1222. As described above, an SIR switching between beams 1012, 1013, and 1014 and varying RF frequencies on those beams may have response rates of 100%, 92%, and 60% when interacting with tag 1222. For outer beams 1015 and 1016, whose centers are far from the tag 1222 and whose contours barely overlap the tag range marker if at all, the response rates are 2% ("[2]") and 0% ("[0]").

Because responses from tag 1222 are received when interrogating signals are transmitted on each of beams 1012-1015, the location of tag 1222 can be estimated to be within an overlap region, where beams 1012-1015 all partially overlap. The location of tag 1222 within the overlap region can be further refined based on measured beam response rates. In this specific example, beam 1012 has a 100% response rate for tag 1222, so tag 1222 lies near the center of its coverage area. The response rates for tag 1222 on beams 1013 and 1014 are smaller than the response rate for beam 1012, which means that tag 1222 is farther from the centers of beams 1013 and 1014 than from the center of beam 1012. Moreover, beam 1013 has a larger response rate for tag 1222 than beam 1014, so tag 1222 is closer to the center of beam 1013 than to the center of beam 1014.

In some embodiments, the ratios between different beam response rates can be used to estimate tag location. In diagram 1342, beam 1012 has a 100% response rate for tag 1222, whereas beam 1013 has a 92% response rate for tag 1222. Accordingly, the location of tag 1222 may be estimated such that a ratio of a distance between the location and beam 1012's target location (or beam center) to a distance between the location and beam 1013's target location corresponds to the ratio between the beam 1012's response rate and beam 1013's response rate. The location estimation can be further refined by using ratios associated with other sets of beams. For example, the location of tag 1222 can be further refined such that a ratio of a distance between the location and beam 1013's target location to a distance between the location and beam 1014's target location corresponds to the ratio between the beam 1013's response rate and beam 1014's response rate, and so on.

Different ratios may correspond to each other in different ways. For example, two ratios may correspond to each other if they have the same value or substantially the same value. Two ratios may also correspond to each other if, when at least one of the ratios is scaled by a respective, not-necessarily-identical scaling factor, both ratios have substantially the same value. In some embodiments, two ratios may correspond to each other if, when at least one ratio is used as input into a respective, not-necessarily-identical algorithm, the algorithm output(s) have substantially the same value as each other or the other ratio.

In some embodiments, weighted averaging or centroid-averaging methods can be used to scale response rates for tag location estimation. In these embodiments, tag response rates are scaled or weighted such that beams with higher tag response rates are more heavily weighted in the location estimation than beams with lower tag response rates. Tag response rates may be weighted by exponentiation, by multiplication with a static or dynamic factor, or by any suitable method. In some embodiments, the slopes of the beam sensitivity responses can be compared to the tag operating profile to refine tag location.

Figure 14:
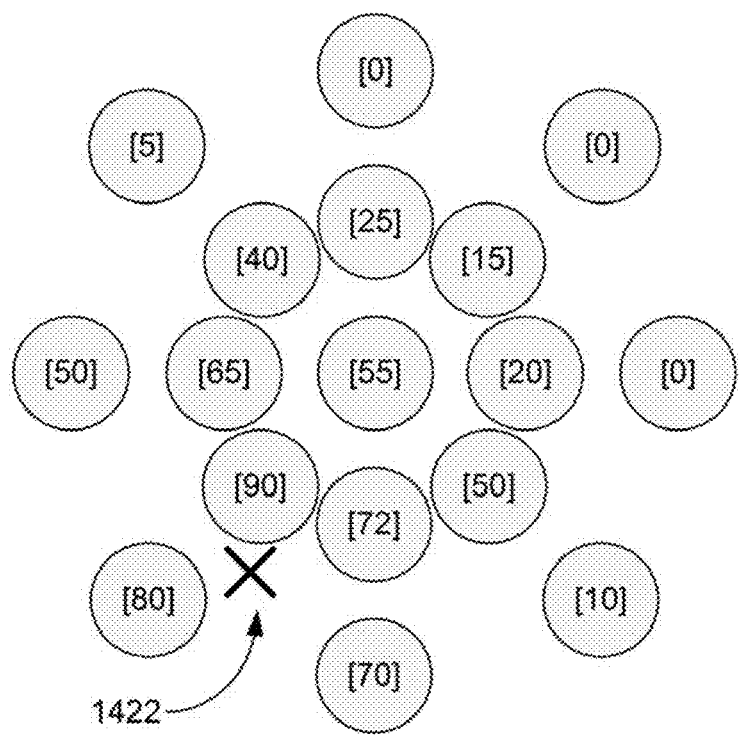
FIG. 14 depicts how a tag's location may be determined using multiple beams.

Whereas the tag location in FIG. 12 was determined, for reasons of brevity and clarity, using beams lying along axis 1018, other beams along other axes may also be used. FIG. 14 depicts how a tag's location may be determined using multiple beams in 2-dimensional space. Diagram 1400 depicts beam patterns similar to those in diagram 1080 of FIG. 10. For clarity, each beam in diagram 1400 is represented by a small shaded circle that does not necessarily represent its coverage area. Tag 1422, similar to tag 1222, is represented by an "X". Each beam has an associated tag response rate (as described in FIG. 13) represented by the bracketed number in the beam's circle. The response rate for a beam is related to the distance between the center of the beam's coverage area and the location of tag 1422. Beams whose centers are closer to tag 1422 have higher response rates than beams whose centers are farther from tag 1422. The location of tag 1422 can then be determined using the different response rates of the different beams, for example using the ratio-based and/or averaging approaches described above.

Although FIGS. 13 and 14 show specific response rates, these values are provided for illustration, and may not correspond to actual response rates. Similarly, the relationships between the response rates provided by adjacent beams shown in FIGS. 13 and 14 are for illustration, and may differ from the actual response rates between adjacent beams.

Whereas a beam's coverage area is depicted as circular in the figures above, in some embodiments a beam's coverage area may be shaped. As one example, FIG. 15 depicts beams with elliptical shapes formed by an SBR according to embodiments.

Figure 15:
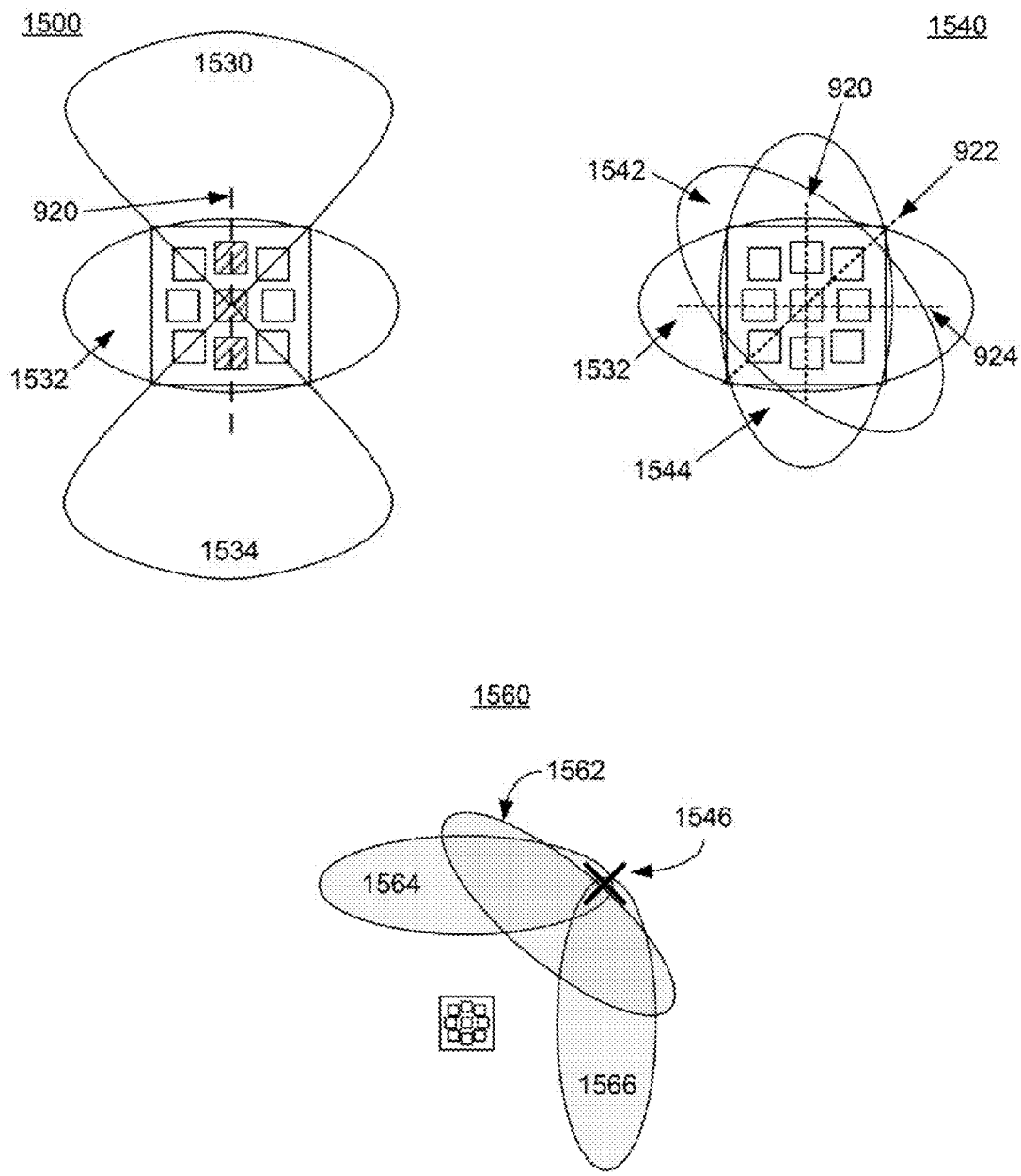
FIG. 15 depicts beams with non-circular beam shapes formed by a synthesized-beam reader according to embodiments.

Diagram 1500 in FIG. 15 is similar to FIG. 9B and depicts beams synthesized by activating antenna elements along plane 920. As described in FIG. 9B, RF beams 1530, 1532, and 1534 (similar to RF beams 930, 932, and 934, respectively) can be synthesized by supplying appropriately-phase-shifted signals to the antenna elements along plane 920. Because only 3 antenna elements are activated, in a line, the SBR of diagram 1500 is able to steer and shape a beam in the vertical direction in diagram 1500 but not in the horizontal direction. Of course, activating additional elements can shift and shape the beam in other directions. Diagram 1540 shows elements activated along line 922 to generate a beam of shape 1542, and elements activated along line 924 to generate a beam of shape 1546. Adjusting the phase of the signals provided to the antenna elements along lines 922, 924, and 926 allows steering beams to different locations, as shown in diagram 1560 for beams 1562, 1564, and 1566, respectively. As described above, a tag at location 1546 in diagram 1560 may produce different response rates with frequency to an SBR steering a beam in these various directions, allowing the SBR to determine the tag's location.

All steered-beam systems generate side beams (sidelobes) in addition to the main beam. As will be known to those skilled in the art, there exist techniques to suppress these sidelobes, such as by adding more steering elements, digital beam shaping, shielding, and other methods, but none can suppress the sidelobes entirely.

Figure 16:
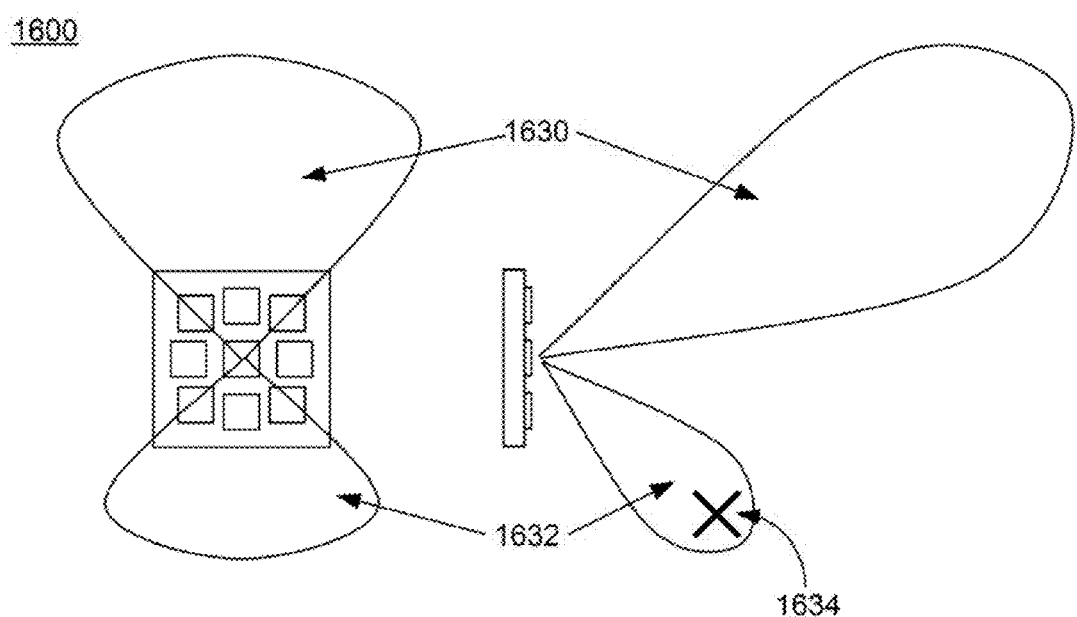
FIG. 16 depicts beams with sidelobes formed by a synthesized-beam reader according to embodiments.

FIG. 16 depicts steered beams with sidelobes formed by an SBR according to embodiments. Diagram 1600, similar to FIG. 9B, depicts a head-on view to the left and a side view to the right of an SBR generating an RF beam 1630 having a sidelobe 1632, which may inventory a tag that is not positioned along the beam's main lobe. For example, beam 1630 points upward, but sidelobe 1632, pointing downward, can erroneously inventory tag 1634. Fortunately, because sidelobes have lower power than main lobes, an SBR can typically use a tag's response rate to discriminate a tag in a main beam (which will have a high response rate) from a tag in a sidelobe (which will have a low response rate). If a detected tag is determined to be located in a sidelobe of the beam, the response rate for that tag in that beam may be excluded during estimation of tag location. In some embodiments, the sidelobe response rate may be adjusted via some algorithm and subsequently used to refine tag location estimation.

Figure 17:
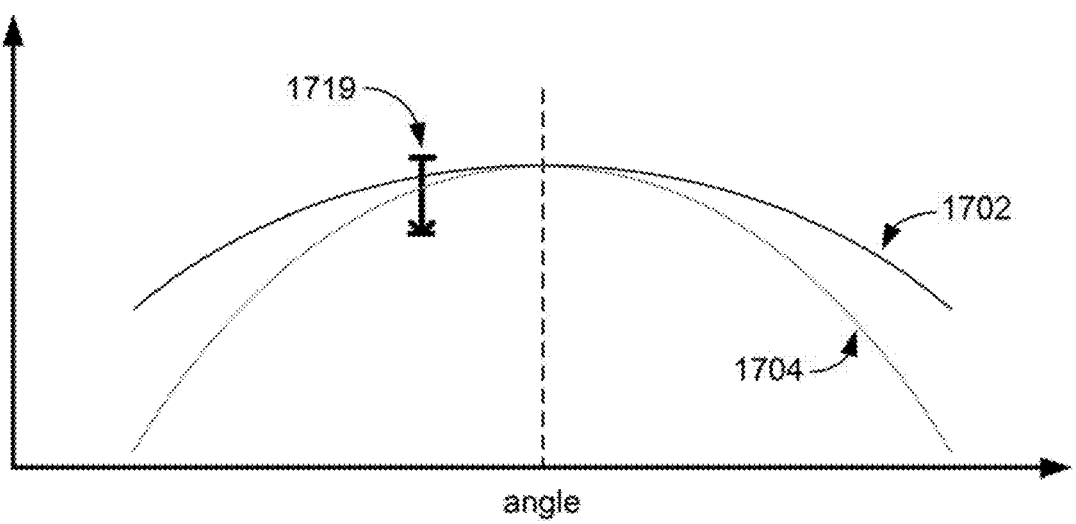
FIG. 17 depicts how frequency-based variations in beam power can be used to determine tag location.

As described above, a tag's sensitivity and response rate may vary with the frequency of the incident beam. A beam's sensitivity contour also varies with frequency, and these variations may be used to estimate tag location. FIG. 17 depicts how frequency-based variations in beam power can be used to determine tag location. Graph 1700 shows a beam having sensitivity contour 1702 associated with a first radio frequency and sensitivity contour 1704 associated with a second radio frequency. Graph 1700 also depicts a tag operating profile 1719 similar to profile 1219. By using beam profiles along with the tag response rates as a function of frequency, an SBR may be able to better estimate the tag's location. In one embodiment, the ratio-based tag location estimation process described above may use a frequency-based response rate comparison, where, for each radio frequency, response rates at different beams are compared. The comparison can be performed for each different radio frequency, and tag location estimation can use the comparisons at the different radio frequencies. For example, a tag's location may be estimated such that a ratio of distances between the estimated location and the target locations of two different beams correspond to both (a) a ratio of response rates of the two beams at a first radio frequency and (b) a ratio of response rates of the two beams at a second radio frequency.

Figure 18:
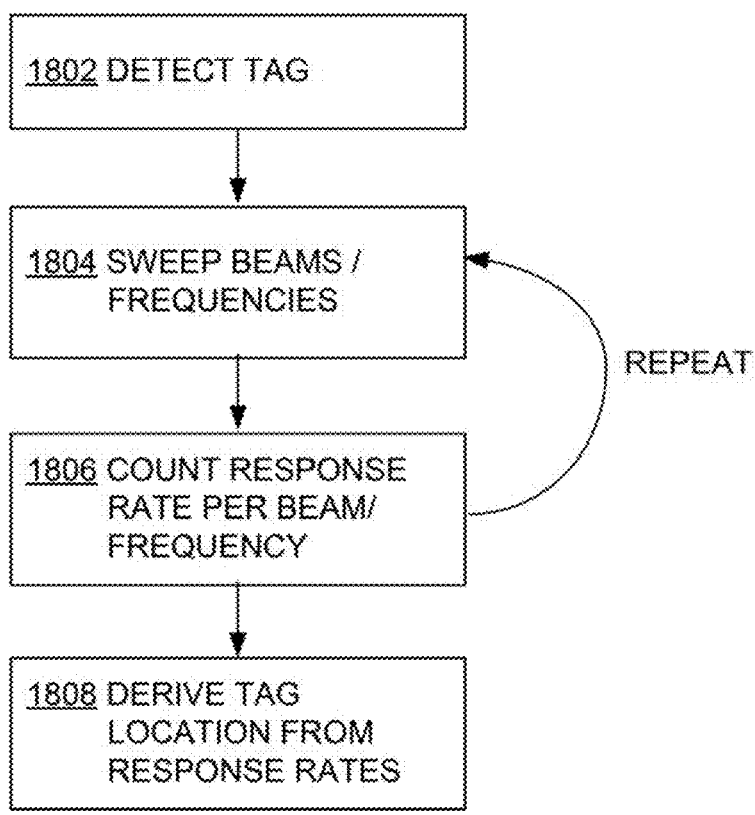
FIG. 18 depicts a process for determining tag location by counting tag reads of a synthesized-beam reader.

FIG. 18 depicts a process 1800 for determining tag location by counting tag reads. Process 1800 begins at operation 1802, where a tag is inventoried by an SBR, on one or more of its generated beams. At operation 1804, the SBR sweeps through different beams and different radio frequencies for each beam, counting the tag response rate in operation 1806. For example, the SBR may generate and count tag reads using a first beam at a first radio frequency, then generate and count tag reads using a second beam at the first radio frequency, and continue this process until it has iterated through all beams. The SBR may then repeat the process for different radio frequencies. Alternatively, the SBR may count tag reads using a first beam at a first radio frequency, then generate and count tag reads using the first beam at a second radio frequency, and continue this process until it has iterated through all radio frequencies. The SBR may then repeat the process for different beams. Of course, the SBR may interleave these choices of beams and radio frequencies in any way imaginable, including randomly. The SBR may act adaptively/intelligently, choosing a subset of beams, and radio frequencies that allow it to locate a tag as quickly and/or accurately as possible. The SBR may alter the polarization of its beams to reduce the impact of tag polarization when determining tag location. The SBR may combine beam/frequency data with other information, such as a map or planogram of a facility (e.g. the SBR may exclude known barriers such as walls from the potential locations for a tag) or tag type (e.g. some tags are more sensitive or directional than others. Finally, at operation 1808, the SBR uses the collected beam, radio frequency, response rate, and other information to determine the tag location. For example, the SBR can estimate the distance of the tag from the centers or target locations of at least two beams by comparing tag response data for the beams, where a higher tag response for a beam indicates that the tag is closer to that beam. The SBR can perform the distance estimation for multiple sets of beams, then use the estimated distances to identify an intersecting region or a region where multiple beams overlap within which the tag is located.

The tag localization techniques described above may be modified in any suitable way. For example, tag location may be performed with two or more separate readers, stationary readers, mobile readers, or any combination of the previous. In some embodiments the tag localization techniques described herein may be used to determine the instantaneous location and direction-of-travel of moving tags, and may also be used to determine whether a particular tag is stationary or in motion, for example as described in more detail below. The localization or location process may be further refined based on some other technique or parameter, such as interpolation, averaging, knowledge of the physical configuration associated with the tag location and/or zone, historical detection data associated with the tag, other data associated with the tag (e.g., purchase data, type of tag, type of item associated with the tag, etc.), data associated with received tag responses (e.g., received signal strength indicator or RSSI, angle-of-arrival, phase, a Doppler parameter or shift of the response, response timing, data included in the response), or any other suitable technique or parameter.

When tracking tags associated with a stationary or moving structure, a reader or location system may adjust tag response rates based on one or more other parameters associated with the structures. For example, tag response rates may be adjusted based on structure movement speed and direction, structure physical configuration, structure orientation, and/or structure composition. A location system may be able to determine the movement speed and direction of a structure based on previous detections of tags associated with the structure, or may receive the speed and direction information from an external source, such as a conveyor system or transporter associated with the structure. Tag response rates may be affected by structure physical configuration due to RF blocking or interference from structural components interposed between readers and tags. Similarly, tag response rates may be affected by structure composition. A metallic structure may block, attenuate, and/or interfere with RF signals between readers and tags than a plastic structure.

A beam's ability to inventory or access a tag is based on the absolute beam power, beam power contour, beam pointing direction, beam frequency, distance to the tag, beam and tag polarization, type of tag, type of tag operation (e.g. inventory versus writing), reader sensitivity, tag sensitivity, and other parameters. When a tag is within a reader's tag inventory range, the tag has sufficient power to receive and respond to reader commands and the reader has sufficient sensitivity to successfully receive tag responses. When a tag lies outside a reader's tag inventory range, either the tag may not have sufficient power to receive and respond to reader commands, the reader may not have sufficient sensitivity to successfully receive tag responses, or both.

Figure 19:
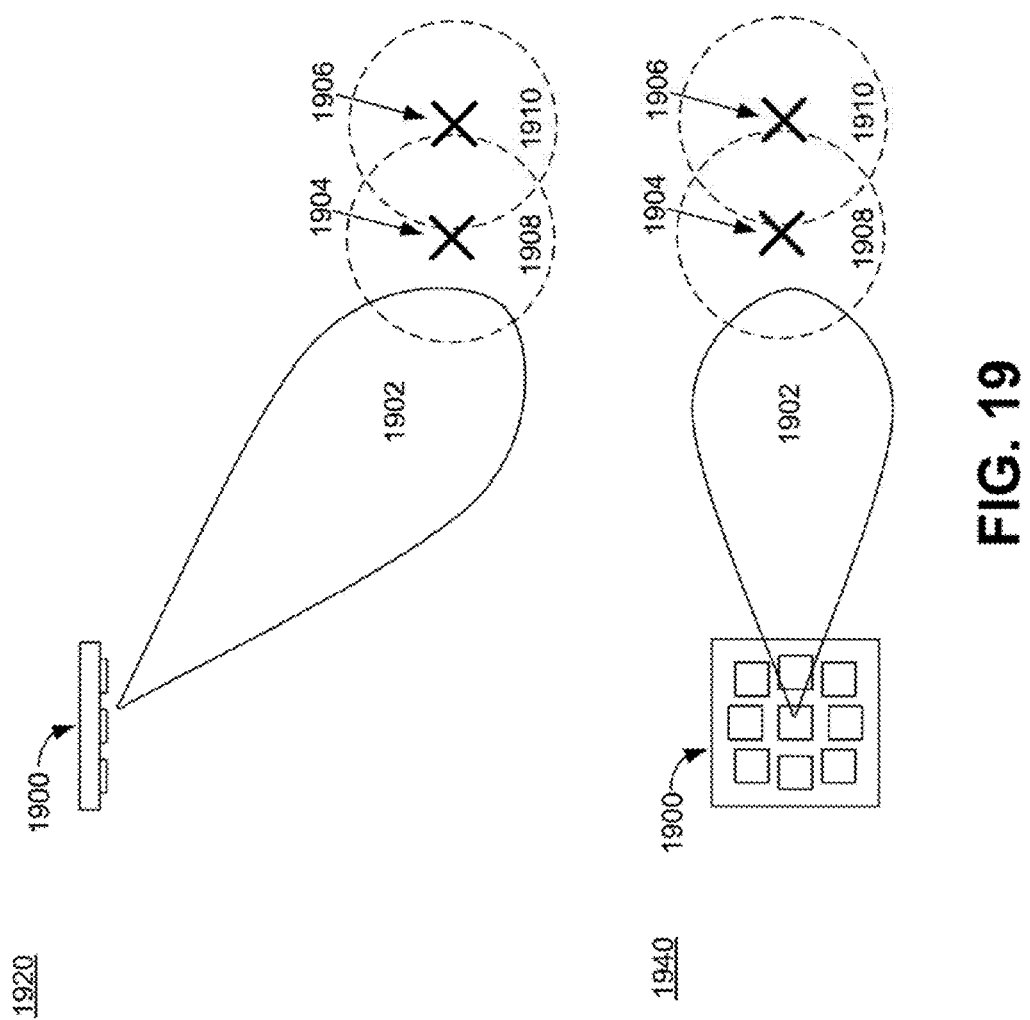
FIG. 19 depicts the effective tag inventory range of a synthesized-beam reader according to embodiments.

FIG. 19 depicts an SBR's tag inventory range according to embodiments. Diagrams 1920 and 1940 show side and head-on views of an SBR 1900 attempting to inventory tags 1904 and 1906 using a beam 1902. Each of the tags 1904/1906 has an associated sensitivity contour, labeled as 1908 and 1910, respectively. SBR 1900 can inventory tag 1904 using beam 1902, because beam 1902's power contour overlaps tag sensitivity contour 1908. SBR 1900 cannot inventory tag 1906 using beam 1902, because beam 1902 does not overlap tag 1906's sensitivity contour 1910.

Suppose that there was a way to deliver additional power to tag 1906 and thereby increase the size of its sensitivity contour 1910. A sufficiently large increase would allow beam 1902 to inventory tag 1906. Of course, one way to increase the size of tag 1906's sensitivity contour is to add a battery to tag 1906. However, it may be desirable to find a way to do so without artificial means such as a battery.

Figure 20:
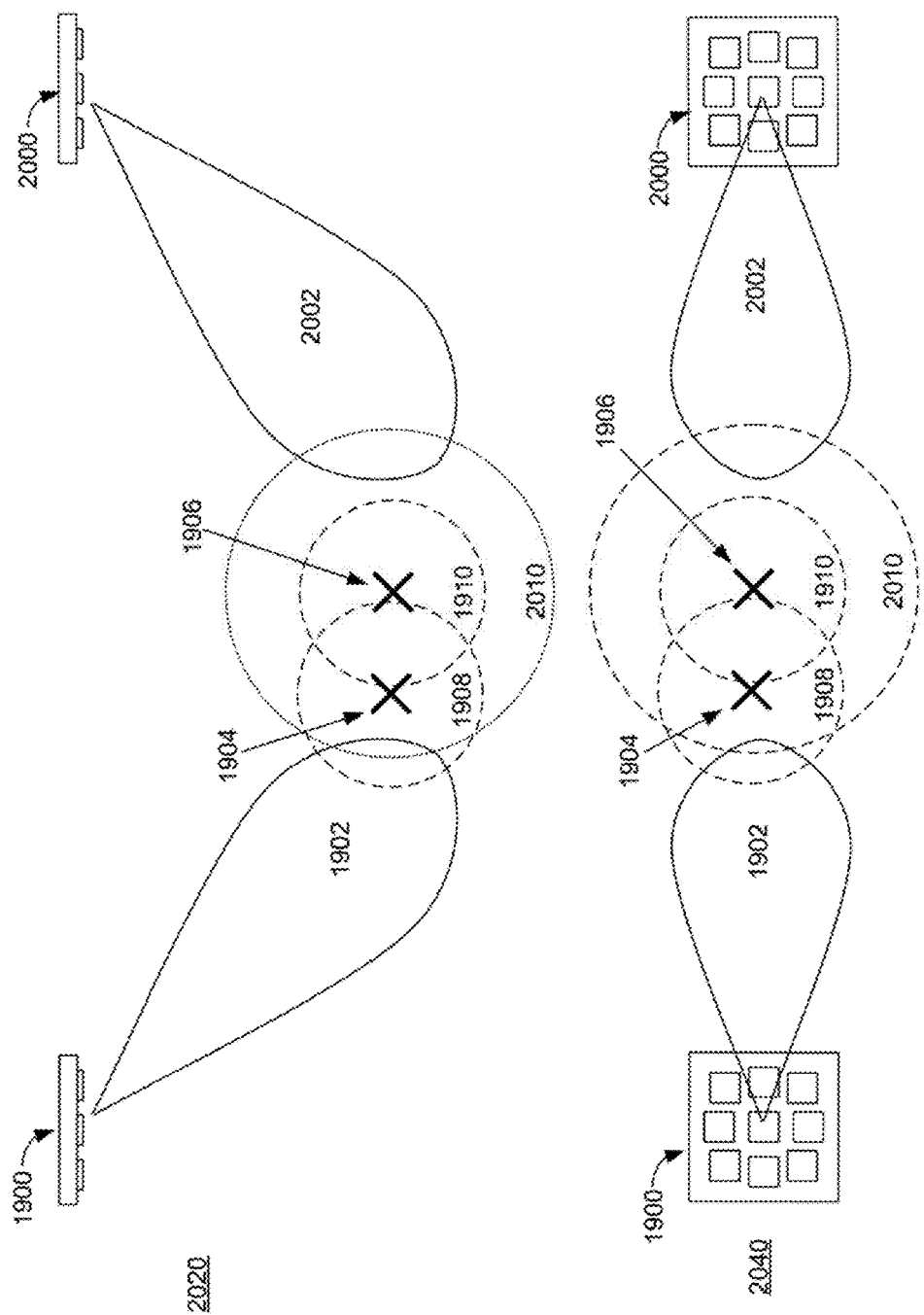
FIG. 20 depicts how a synthesized-beam reader's effective tag inventory range can be increased using another synthesized-beam reader according to embodiments.

FIG. 20 depicts how a tag's sensitivity contour can be increased by using a cooperating SBR to deliver additional RF power, according to embodiments. FIG. 20, similar to FIG. 19, depicts side and head-on views 2020 and 2040, respectively, of SBR 1900 attempting to inventory tags 1904 and 1906. FIG. 20 also includes another SBR 2000 positioned to deliver additional RF power to tag 1910 using beam 2002. In FIG. 20 as depicted, neither SBR 1900 nor SBR 2000 can inventory tag 1906 on its own, because beams 1902 and 2002 lie outside sensitivity contour 1910 of tag 1906. However, if SBR 1900 and SBR 2000 deliver RF power at the same time, then the effective sensitivity contour of tag 1906 increases from perimeter 1910 to perimeter 2010, allowing both SBR's to inventory tag 1906. In practice, there are many ways for SBR 1900 and SBR 2000 to cooperate. SBR 1900 can issue inventory commands while SBR 2000 sends raw RF power (a continuous or minimally modulated wave). Or SBR 1900 can send raw RF power while SBR 2000 issues inventory commands. Or both SBR 1900 and SBR 2000 can issue synchronized inventory commands. Regardless of the means, two SBRs can deliver more power than one, and if the two SBRs are synchronized to cooperatively provide power than tag 1906, which was invisible to either SBR singly, can become visible to one or both of them.

In some embodiments, the two SBRs may use the same RF frequency during such cooperative powering, particularly in cases where the SBRs send synchronized commands. In other embodiments, particularly those in which one SBR provides commands and the other raw RF power, the SBRs may use significantly different frequencies to avoid the RF frequencies generating beat notes that confuse the tag's demodulator (such as demodulator 442 in FIG. 4). Of course, the SBRs may optimize their choice of frequency based on beam or tag polarization, tag type, the tag's ability to reject interference such as beat notes, and other parameters. The SBR's may also adjust their relative or absolute delivered power to improve the cooperative powering. In some embodiments one of the SBRs need not be an SBR at all, but could instead be a fixed (i.e. not steered beam) reader, a handheld reader, a shelf reader, a dock-door reader, or any other RFID reader as will be known to those skilled in the art. In some embodiments a controller and/or one or both of the SBRs can adjust the power and/or frequency of the generated RF signal(s) to increase the inventorying range of the RFID tag. In some embodiments the adjustment may include sweeping over a range of power and/or frequency values; in other embodiments the adjustment may be adaptive and based on environmental conditions (for example, RF noise or the dielectric properties of items to which tags are attached), received tag replies, tag performance characteristics (for example, sensitivity, interference rejection or ability to harvest power from another RF source), and/or tag population size. In some embodiments, one of the SBRs will point to the target location and another SBR may steer its beam to multiple locations in the vicinity of the target location to improve the cooperative powering.

Figure 21:
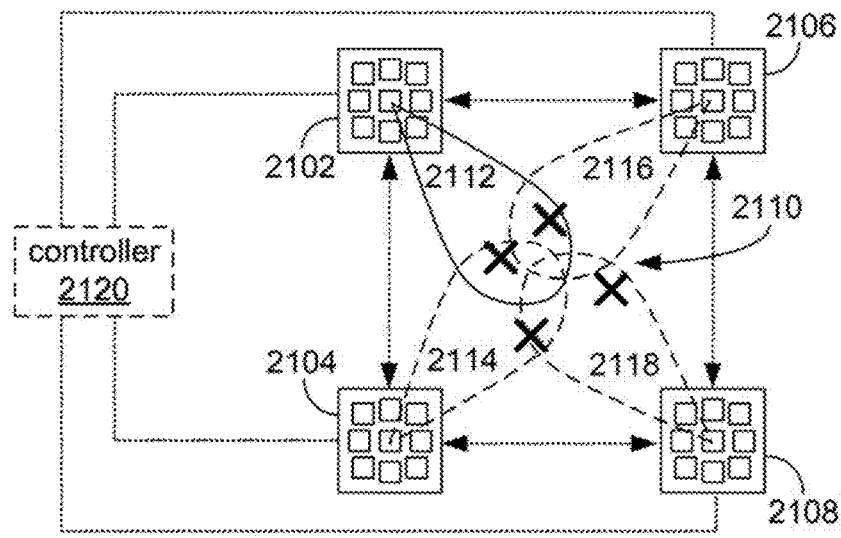
FIG. 21 depicts how multiple synthesized-beam readers can cooperate to communicate with a population of tags according to embodiments.
Figure 21:
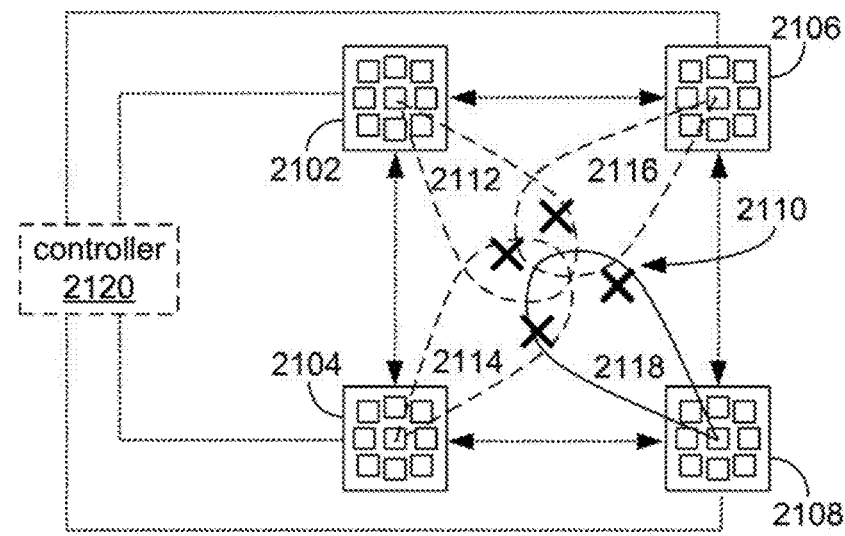

Of course, the benefits of cooperative tag powering need not be limited to a pair of SBRs. FIG. 21 depicts how multiple SBRs can cooperate to inventory a tag population according to embodiments. Diagram 2100 depicts four SBRs 2102, 2104, 2106, and 2108 arranged to inventory a tag population 2110. In diagram 2100. SBR 2102 is configured to communicate with tags 2110 using beam 2112, while SBRs 2104-2108 are configured to provide power to tags 2110 using beams 2114, 2116, and 2118, respectively. In diagram 2150, SBR 2108 is instead configured to inventory tags 2110 using beam 2118, while SBRs 2102-2106 provide additional power. Of course, any of the SBRs can do the inventorying while the others deliver power, or two can inventory (synchronously or not) while the other two deliver power, or any other possibility. In some embodiments, one or more of the SBRs may be configured to receive signals from tags 2110 without generating beams, while the other SBRs generate beams to transmit inventory commands and/or provide power to tags 2110, similar to the operation of a bistatic radar system. For example, SBR 2102 may be configured to receive signals from tags 2110 without generating beam 2112, while SBRs 2104-2108 generate beams 2114-2118, respectively, to transmit inventory commands and/or provide power to tags 2110. In some embodiments, SBRs configured to receive signals from tags 2110 may generate beams with relatively lower power than other SBRs configured to primarily transmit inventory commands and/or provide power to tags 2110, potentially increasing the receive sensitivity of the receiving SBRs. Of course, the number of SBRs is arbitrary—four are shown but more or less can be used in actual practice.

In some embodiments a controller, such as controller 2120 in diagrams 2100 and 2150, can perform SBR coordination to cooperatively inventory and power tags using SBRs 2102, 2104, 2106, and 2108. In other embodiments controller 2120 can be embedded within one or more of the SBRs. In yet other embodiments the SBRs can form a peer-to-peer communication network and synchronize with each other.

In general, an SBR synthesizes an RF beam to point at locations (e.g. beam areas-of-coverage shown in FIG. 10), for durations, and at times according to a scanning pattern, which may be predetermined or dynamic. A pointing location can be identified by the one or more SBRs as a beam indicator (such as a numeric indicator), a location on the floor of a facility in which the SBRs are located, a set of Cartesian or polar coordinates, or any other suitable location identifier.

In some embodiments, the scan pattern is a sequence of target locations and an SBR may synthesize beams to point at the different target locations based on a timer, a trigger signal generated by the SBR or a controller, and/or communications from one or more other SBRs. In some embodiments, the scan pattern is at least one target location and at least one corresponding target-location time, defined as the time at which two different SBRs point to the target location. The target-location time may be absolute (for example, 4:00 pm) or relative (for example, ten milliseconds after a trigger or timer signal or communication). An SBR may store the scan pattern in memory, receive a scan pattern from a controller (e.g., controller 2120, another SBR, a network device, or some other controlling entity), generate a scan pattern using information received from a controller or other SBRs, generate a scan pattern randomly, generate a scan pattern to optimize tag cooperative powering, or generate a scan pattern based on any other suitable parameter(s). In some embodiments, an SBR's scan pattern may be overridden temporarily (or permanently) by a controller or another SBR.

The assignment of roles (inventorying or powering) to different SBRs may depend on history (i.e. whether an SBR was most recently an inventorying SBR or a powering SBR), the SBR's location, the number of tags the SBR has inventoried recently or historically, the number of tags all or a subset of the SBRs have inventoried, or any other number or type of suitable parameters. In some embodiments the SBR role assignments may be preset—for example, a particular SBR may be assigned to inventory for a period of time, provide power for another period of time, and then repeat. In other embodiments SBR role assignments may be dynamic or adaptive, even during an ongoing communication with a tag. For example, one reader may begin and then interrupt a dialog with a tag. Another reader may then continue the interrupted dialog with the tag while the original reader provides power or performs some other task.

In some embodiments, SBRs may be configured to cooperatively power tags only in certain circumstances. For example, if one SBR is using one of its outer beams to inventory tags then other SBR may cooperatively power the tags, knowing that cooperative powering is particularly effective when used with outer SBR beams. As another example, if a tag is moving toward the periphery of an SBR's field-of-view (and therefore into its outer beam coverage), other SBR may cooperate to provide additional power. As yet another example, if the number of inventoried tags is less than an expected number, other SBRs may provide additional power to boost tag sensitivity and thereby allow more tags to be inventoried. As yet another example, if a tag indicates that it has insufficient power to perform an operation, such as writing data to memory, other SBRs may provide additional power so the tag can perform the operation.

Figure 22:
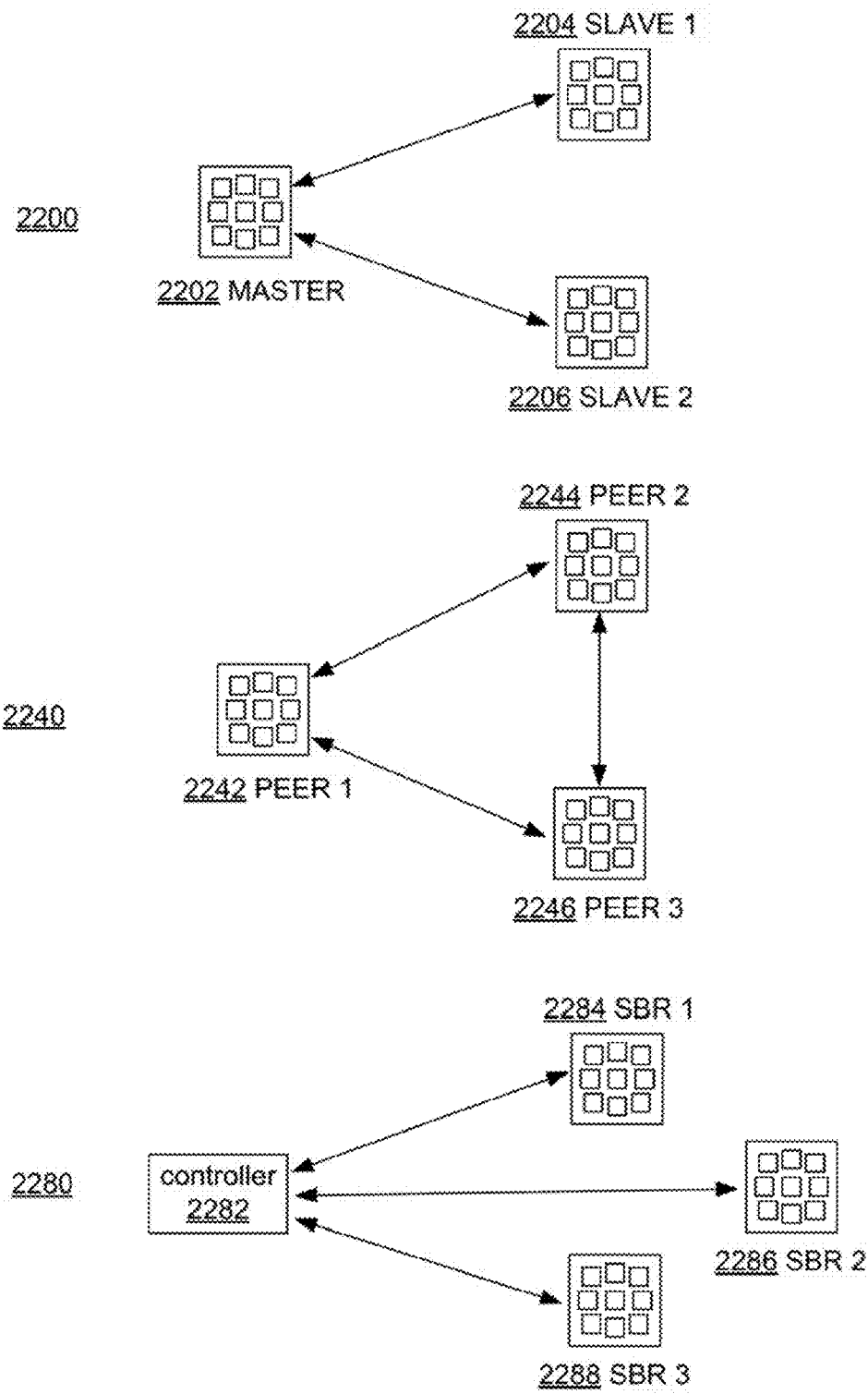
FIG. 22 depicts methods of controlling multiple synthesized-beam readers according to embodiments.

As described above, SBRs may be configured to receive and/or exchange information about target locations, scan patterns, scan timing, beam configuration, tags, cooperative powering, and roles. FIG. 22 depicts a variety of ways in which SBRs can receive and/or exchange such information. Diagram 2200 depicts a first configuration in which a master SBR 2202 coordinates the operations of two slave SBRs 2204 and 2206. Diagram 2240 depicts a second configuration in which three SBRs, 2242, 2244, and 2246 coordinate operation via peer-to-peer communications. Diagram 2280 depicts a third configuration in which a centralized controller 2282 coordinates the operations of three SBRs 2284, 2286, and 2288. Of course, multiple variants on these themes are possible including using more or less SBRs; mixing the configuration (for example, a controller coordinating peer-to-peer communications); using multiple controllers, and endless other combinations as will be obvious to those of ordinary skill in the art. Communication between SBRs and controllers (if present) can be implemented using a wired connection (e.g., Ethernet, parallel, serial, or other suitable wired protocol), a wireless connection (e.g. WiFi, cellular, Bluetooth, or other suitable wireless protocol), a point-to-point protocol, a packet or address-based protocol, or any other suitable connection type or protocol.

Figure 23:
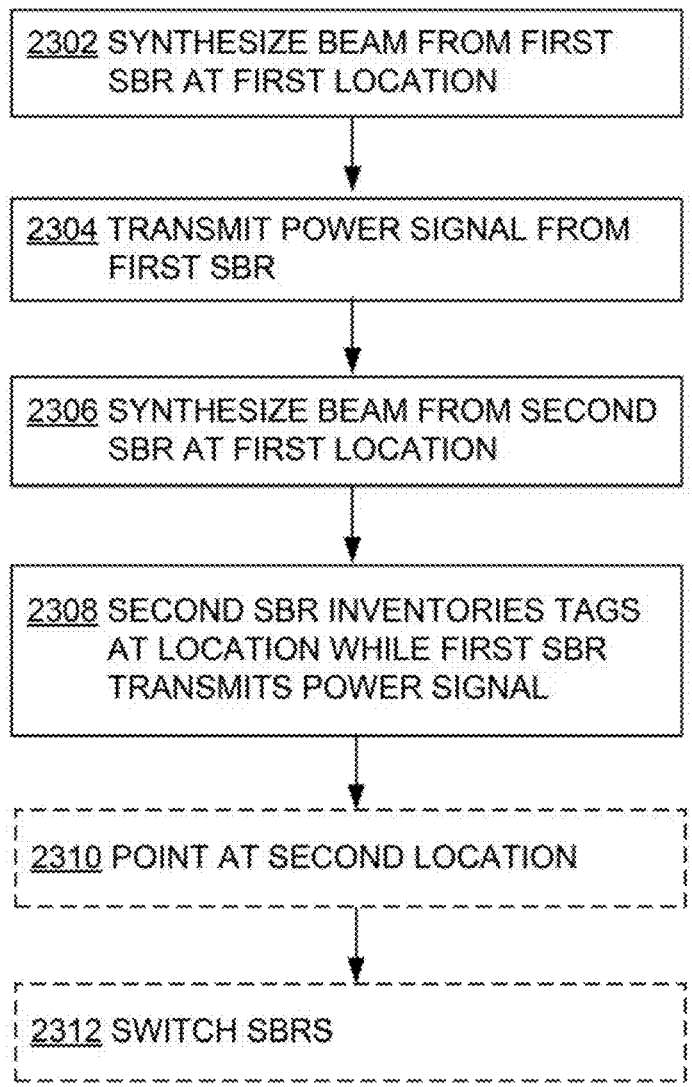
FIG. 23 depicts a process for using cooperating synthesized-beam readers to enhance tag inventory range according to embodiments.

FIG. 23 depicts a process 2300 for coordinating SBR operation according to embodiments. Process 2300 begins at operation 2302, where a first SBR (e.g., SBR 2000) synthesizes a beam (e.g., beam 2002) to point at a first location. At operation 2304, the first SBR transmits a minimally modulated (power) signal. At operation 2306, a second SBR (e.g., SBR 1900) synthesizes a beam (e.g., beam 1902) to also point at the first location. At operation 2308, the second SBR inventories one or more tags at the first location while the first SBR continues to transmit power. At optional operation 2310, first and second SBRs repeat the above operations while pointing at a second location, for example as described above in FIG. 21. At optional operation 2312, the first and second SBRs may switch roles, with the first SBR inventorying tags while the second SBR transmits power. Of course, in other embodiments more than two SBRs may participate in process 2300.

The SBR functionality described above may be combined with other tag processes. For example, cooperative powering may be combined with the response-rate-based tag location processes described above. As another example, cooperative powering may be combined with a forward-error-correction tag operating mode in order to increase reader sensitivity. In the latter example, tags may be configured or instructed (e.g., via a reader command) to use forward error correction (FEC) while backscattering responses. When using FEC, tags may include an error-correction code (ECC), such as a block code or a convolutional code, in backscattered responses. Readers may be able to more easily (e.g., with higher probability of success) recover backscattered tag responses including FEC than backscattered tag responses without FEC.

In some embodiments, cooperative powering may be combined with tag population management processes to improve inventory performance and detect tag movement. One such tag population management technique is a tag refresh, also described in U.S. Pat. No. 9,330,284, entitled "Broadcast Refresh of RFID Tag Persistence" and issued on May 3, 2016, which is hereby incorporated by reference in its entirety. Tags capable of executing refresh operations can, upon receiving an appropriate reader command or meeting certain criteria, increase the persistence time of one or more tag flags. Tags may increase flag persistence time by adjusting a flag physical parameter, such as voltage, current, charge, and/or flux, as described in the above-referenced patent.

Figure 24:
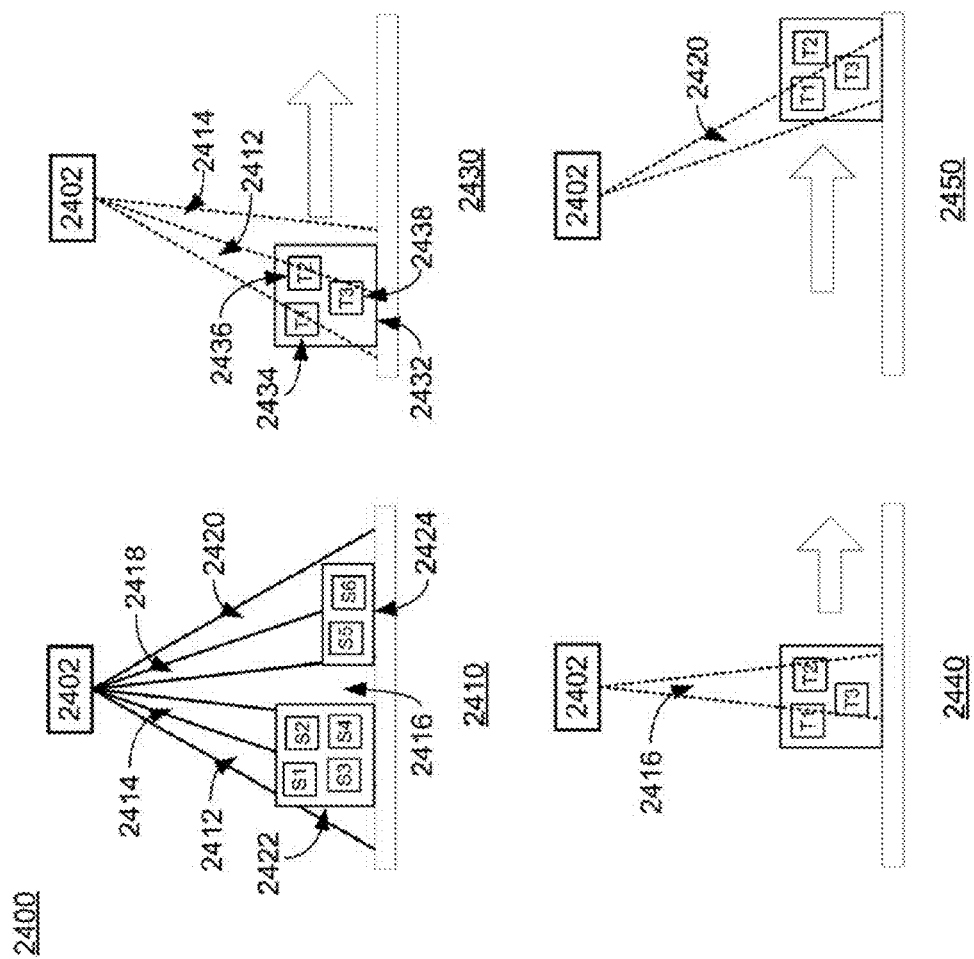
FIG. 24 is a conceptual diagram showing side views of a synthesized-beam reader at different stages of a tag motion-tracking process according to embodiments.

The tag refresh functionality may assist in determining the direction of a tag's movement in an environment that contains multiple other tags. FIG. 24 is a conceptual diagram 2400 showing side views of an SBR system at different stages of a tag motion tracking process according to embodiments.

In diagram 2400, an SBR 2402 is configured to generate outer RF beams 2412, 2414, 2418, and 2420, and a central RF beam 2416. SBR 2402 typically scans among its different beams 2412-2420 (and also between other beams not depicted in FIG. 24) continuously, to look for tags within its coverage area (e.g., as depicted in diagram 1080).

At stage 2410 of the tag-motion tracking process, SBR 2402 first inventories stationary tags S1-S4 in container 2422 and stationary tags S5-S6 in container 2424 in a first session. SBR 2402 then broadcasts a refresh signal to the stationary tags to keep them quiet in the first session. In some embodiments, these stationary tags may also be inventoried in a second session. In some embodiments the inventoried flags in the second session do not decay while the tags receive power.

At subsequent stage 2430, a container 2432 with tags of interest (TOIs) 2434, 2436, and 2438 moves rightward into SBR 2402's coverage area. As they enter the coverage area, SBR 2402 inventories these TOIs with outer RF beams 2412 and 2414, using the second session for the inventorying. Upon observing these new, previously unseen TOIs, SBR 2402 begins a tracking process that includes using an alternative session that is different from the second session (such as the first session, although any session other than the second may be used).

An inventorying process (such as described in the UHF Gen2 Specification) involves a series of steps involving the exchange of information between a reader (such as SBR 2402) and a tag. The process causes state changes in the reader and/or tag—for example, the reader may request an identifier from the tag, the tag may reply with its identifier, the reader may acknowledge receipt of the identifier, and the tag may then assert an inventoried flag in response to the acknowledgement. In some embodiments a reader may wish to inventory a tag without causing the tag to assert its inventoried flag. The reader may accomplish non-acknowledgment by beginning the inventorying process as described above, but either not acknowledge receipt of the tag-provided identifier or transmitting a non-acknowledgement command to the tag. The NAK command in the UHF Gen2 Specification is one such non-acknowledgment command.

At stage 2440, SBR 2402 inventories tags with central beam 2416 using the alternative session. Because TOIs 2434-2438 have not yet been inventoried in the alternative session, their inventoried flags should be in the A state (i.e. denoting not inventoried), and they should respond to SBR 2402. When SBR 2402 receives an identifier from one of these TOIs 2434-2438, which it previously determined to be new and of-interest, SBR 2402 transmits a non-acknowledgement command to the TOI, thereby causing the TOI not to change the state of its inventoried tag and thus facilitating subsequent reinventorying. Moreover, because SBR 2402 previously inventoried the TOI with its outer RF beams and is now inventorying the TOI with its central RF beam, it may infer that the TOI has moved from the coverage area of outer RF beams 2412/2414 to the coverage area of central RF beam 2416.

As mentioned above, an RFID reader (such as SBR 2402) may unintentionally miss (i.e. not inventory) a tag (such as one of TOIs 2434-2438) in one of its beams. To compensate for such misses. SBR 2402 may associate TOIs that it believes to be traveling together, such as TOIs 2434-2438, in a set. SBR 2402 may form this belief from the fact that it inventoried TOIs 2434-2438 at the same time, from tracking TOIs 2434-2438 moving together for a period of time, from information provided to it about TOIs 2434-2438, from similar TO identifiers, or from other information or sources or characteristic of the TOIs. By assuming the association among the TOIs, even if SBR 2402 misses one of the TOIs in a beam, such as in beam 2440, it may still assume that the missed TOI is moving with the others in the set.

At stage 2450, SBR 2402 inventories TOIs 2434-2438 with outer RF beam 2420. Similar to stage 2440, SBR 2402 may inventory the TOIs in the alternative session and, after receiving a TOI identifier and determining that the TOI was previously inventoried, may transmit a non-acknowledgement command to the TOI.

In the example of FIG. 24, by first inventorying the tag in the second session, with all static tags already in the B state, SBR 2402 can quickly identify new TOIs. By using non-acknowledgment commands in the alternative session, SBR 2402 can continue to observe the TOIs in a sea of static tags. By tracking a TOI across beams 2412, 2414, 2416, and 2420, SBR 2402 and may infer that a TOI is moving.

Whereas the example in FIG. 24 depicts tracking TOIs moving linearly in one direction (rightward), SBR 2402 may be configured to track TOIs moving in other directions, in linear or nonlinear paths. For example, SBR 2402 can be configured to track TOIs that enter its coverage area along one axis and leave along another (i.e., TOIs that change movement direction within the SBR coverage area). Similarly, SBR 2402 can be configured to track TOIs that move in a curved path.

Figure 25:
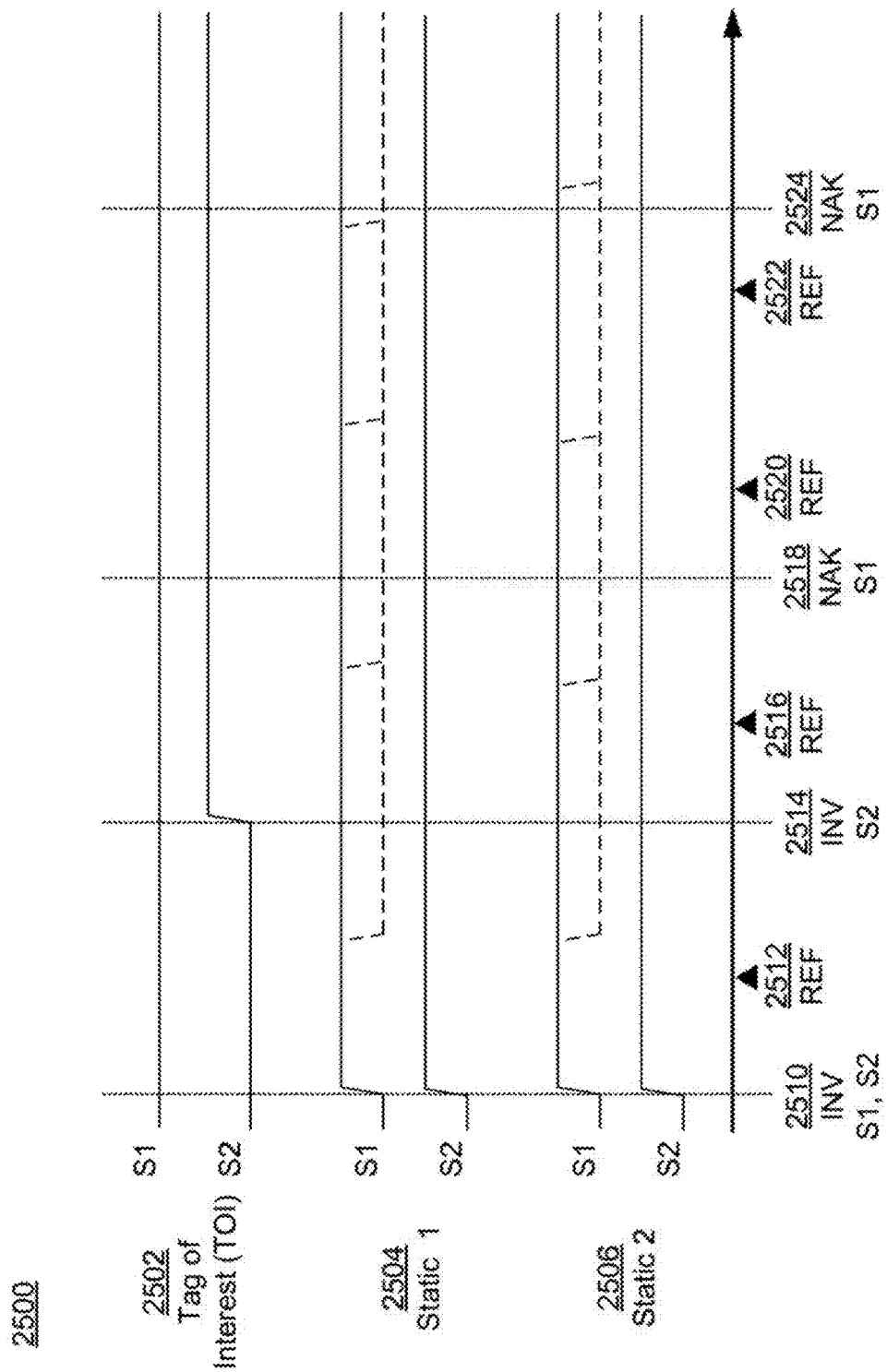
FIG. 25 depicts a timing diagram for a tag tracking process with tag refresh commands according to embodiments.

In some embodiments, an SBR may use tag refresh commands as described above to assist in tag tracking. For example, SBR 2402 may use refresh commands to maintain the inventoried flags of the static tags in containers 2422 and 2424. FIG. 25 shows a timing diagram 2500 for a tag tracking process with tag refresh commands according to embodiments. Timing diagram 2500 displays the values of the session one (S1) and two (S2) flags a TOI 2502 and two static tags 2504 and 2506. In timing diagram 2500, a flag is asserted when its value is high and not asserted when its value is low. The horizontal axis of the timing diagram 2500 represents time, with events to the left preceding events to the right.

At initial time 2510, an SBR inventories static tags 2504 and 2506 in both S1 and S2 sessions and instructs them to assert their S1 and S2 flags. Whereas timing diagram 2500 depicts these tags being inventoried in both sessions at the same time, in typical embodiments the tags are first inventoried in one session and then in the other session.

At subsequent time 2512, the SBR transmits a refresh command to static tags 2504 and 2506 as described above. Without the refresh command at time 2512, the S1 flags of static tags 2504/2506 would decay (as depicted by the dotted curves) shortly after time 2512. In the depicted embodiment, the S2 flags of the static tags 2504/2506 does not decay, because a tag's S2 flag value persists when the tag is powered (as described in the Gen2 Specification).

At time 2514, the SBR inventories TOI 2502 in session S2 and causes its S2 session flag to be asserted as a result of being inventoried.

At time 2516, the SBR transmits another refresh command to static tags 2504/2506 to maintain their S1 flag values, which would otherwise decay.

At time 2518, the SBR inventories TOI 2502 in session S1. After receiving an identifier from TOI 2502, the SBR transmits a non-acknowledgement command (such as a Gen2 NAK command), causing TOI 2502's S1 session flag to remain deasserted.

At times 2520 and 2522 the SBR transmits refresh commands to maintain the S1 session flag values of static tags 2504 and 2506. At time 2524, the SBR again inventories TOI 2502 in session S1 and terminates the inventorying process by transmitting a NAK command, leaving TOI 2502's S1 session flag of deasserted.

By first using session S2 to find TOI 2502 among static tags whose S2 session flags are held asserted by being powered, and then using session S1 and NAKs to read TOI 2502 multiple times among static tags whose S1 session flags are refreshed, the SBR is able to inventory TOI 2502, in multiple beams as described above, and track its movement. Of course, the above session-flag choices are arbitrary—session flags S1 and S2 could be swapped, or session flag S3 could be used instead of session flag S1, or session flag S3 could be used instead of session flag S2, or the tags could have customer session flags with different names and attributes.

Figure 26:
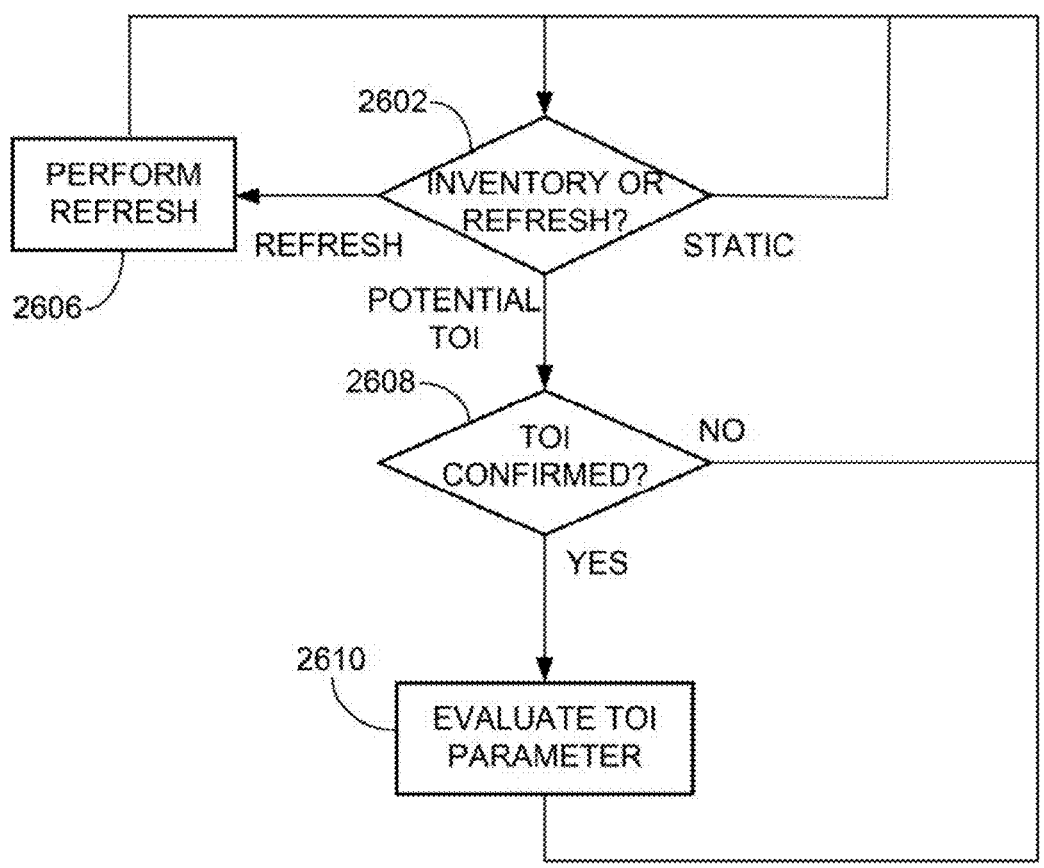
FIG. 26 is a flowchart of a tag tracking process according to embodiments.

FIG. 26 is a flowchart of a tag tracking process 2600, as may be performed by an SBR such as SBR 2402, according to embodiments.

In step 2602, the SBR determines whether to inventory tags or transmit a flag refresh command. The SBR may determine whether to transmit a refresh command based on whether it has recently inventoried any TOIs, the time since the last refresh command, the number of static tags, or any other suitable condition or combination of conditions.

If the SBR chooses to send a refresh command then it transmits a refresh command in step 2606, as described above in relation to step 2406 in FIG. 24. If the SBR chooses to inventory tags then it may receive an identifier from a static tag or a TOI. The SBR may determine whether a tag is static or a TOI based on any of the above-described criteria, such as whether the SBR has observed the tag previously, whether the tag is moving, whether the tag has an identifier of interest, etc. The SBR may use multiple of its RF beams to inventory tags, and may use one or more sessions. Unless the SBR observes a TOI, it returns to step 2602.

If the SBR finds a potential TOI then, in step 2608, it determines if the TOI was previously observed. If confirmed then the SBR may evaluate a TOI parameter (e.g., whether the TOI is moving, which direction it came from/is going, speed, path, etc.) in step 2610. If the TOI is not confirmed then the SBR returns to step 2602 without evaluating a TOI parameter. Subsequently, the reader returns to step 2602.

In some embodiments, the SBR prioritizes the order in which it performs the tasks in step 2602 either in a fixed sequence or dynamically, based on information received from tags or from external sources.

Whereas the above tag-tracking process uses session S1, which decays over time, in other embodiments the process may use a different session that does not decay while the tag is energized, such as S3. In these embodiments refresh step 2606 may be omitted.

The steps described in processes 1800, 2300, and 2600 are for illustration purposes only. RFID tag management using SBRs may be performed employing additional or fewer steps and in different orders using the principles described herein. Of course, the order of the steps may be modified, some steps eliminated, or other steps added according to other embodiments.

Whereas in the above description the RF beams for transmitting and receiving are synthesized by an SBR, in some embodiments one or more of the beams, in either or both of the transmit and receive functionalities, may be generated without the use of a synthesized-beam antenna. For example, the transmit beams may be generated by a synthesized-beam antenna but the receive beam may employ a static antenna such a a patch, monopole, dipole, etc. As another example, the synthesized beams may be replaced by multiple static antennas coupled to one or more readers.

According to some examples, a method to estimate a location of a Radio Frequency Identification (RFID) integrated circuit (IC) coupled to an antenna is provided. The method includes generating multiple radio-frequency beams, where each beam is directed to a different target location, transmitting multiple interrogating signals on each beam, and receiving, on each beam, at least one response from the IC to the interrogating signals. The method may further include determining a response rate for each beam, selecting a first beam having a first response rate and a second beam having a second response rate, where the first beam partially overlaps the second beam to form an overlap region, and using a target location of the first beam, a target location of the second beam, and the first and second response rates to estimate the IC location within the overlap region.

According to some embodiments, a ratio of a first distance between the first beam target location and the estimated IC location to a second distance between the second beam target location and the estimated IC location may correspond to a ratio of the first and second response rates. The method may further include transmitting the multiple interrogating signals at multiple radio frequencies and determining the first and second response rates at a first one of the multiple radio frequencies. A ratio of the first distance to the second distance may correspond to both a ratio of the first response rate to the second response rate and a ratio of a third response rate to a fourth response rate, where the third response rate is associated with the first beam, the fourth response rate is associated with the second beam, and the third and fourth response rates are determined at a second radio frequency different from the first radio frequency. The method may further include selecting the first radio frequency based on an environmental condition, a previously received IC response, a performance characteristic of the IC, and/or a tag population size. The method may further include refining the estimated IC location by comparing a sensitivity contour of the first and/or second beams to a frequency-dependent operating profile of the IC and/or a tag including the IC.

According to other embodiments, the method may further include selecting a third beam having a third target location and a third response rate, where the third beam partially overlaps the first and second beams to form the overlap region. The IC location estimation may be done using the first, second, and third beam target locations and the first, second, and third response rates. A ratio of the first distance to the second distance may correspond to a ratio of the first and second response rates, and a ratio of the first distance to a third distance between the third beam target location and the estimated IC location may correspond to a ratio of the first and third response rates. The method may further include generating the multiple beams from a synthesized-beam RFID reader and/or multiple RFID readers. Each beam response rate may be a count of responses received on the respective beam divided by the number of interrogating signals transmitted on the respective beam. The method may further include determining excluded locations for the RFID IC based on map information and removing the excluded locations from the region.

According to other examples, a method to estimate a location of an RFID IC coupled to an antenna is provided. The method includes generating multiple pairs of radio-frequency (RF) beams, where each beam pair is directed to a different target location and the beams within each beam pair cooperatively provide RF power to the target location, transmitting multiple interrogating signals on at least one beam of each beam pair, and receiving, on at least one beam of each beam pair, at least one response from the IC to the interrogating signals. The method may further include determining a response rate for each beam pair, selecting a first beam pair having a first response rate and a second beam pair having a second response rate, where the first beam pair partially overlaps the second beam pair to form an overlap region, and using a target location of the first beam pair, a target location of the second beam pair, and the first and second response rates to estimate the IC location within the overlap region.

According to some embodiments, one beam of at least one pair may transmit the interrogating signal and the other beam may transmit a substantially unmodulated continuous-wave signal, and/or both beams of at least one pair may transmit synchronized interrogating signals. A ratio of a first distance between the first beam pair target location and the estimated IC location to a second distance between the second beam pair target location and the estimated IC location may correspond to a ratio of the first and second response rates. The method may further include transmitting the multiple interrogating signals at multiple radio frequencies and determining the first and second response rates at a first one of the multiple radio frequencies. In some embodiments, a ratio of the first distance to the second distance may correspond to both a ratio of the first response rate to the second response rate and a ratio of a third response rate to a fourth response rate, where the third response rate is associated with the first beam pair, the fourth response rate is associated with the second beam pair, and the third and fourth response rates are determined at a second radio frequency different from the first radio frequency. The method may further include selecting the first frequency based on an environmental condition, previously received IC replies, a performance characteristic of the RFID IC, and/or a tag population size. The method may further include selecting transmitting radio frequencies for each beam in a pair to avoid generating beat notes. The method may further include selecting a third beam pair having a third target location and a third response rate, where the third beam pair partially overlaps the first and second beam pairs to form the overlap region. The IC location estimation may be done using the first, second, and third beam target locations and the first, second, and third response rates. A ratio of the first distance to the second distance may correspond to a ratio of the first and second response rates, and a ratio of the first distance to a third distance between the third target location and the estimated IC location may correspond to a ratio of the first and third response rates.

According to further examples, a method for an RFID synthesized-beam reader to estimate a location of an RFID IC coupled to an antenna is provided. The method includes serially synthesizing each of multiple beams according to a scan pattern, where each beam is directed to a different target location, transmitting a series of interrogating signals on each beam, and receiving, on each beam, at least one response from the IC to the series of interrogating signals. The method may further include determining a response rate for each beam, selecting a first beam having a first response rate and a second beam having a second response rate, where the first beam partially overlaps the second beam to form an overlap region, and using a target location of the first beam, a target location of the second beam, and the first and second response rates to estimate the IC location within the overlap region.

According to some embodiments, the method may further include, for each beam, discriminating, based on the beam's response rate, whether the IC is in a sidelobe of the beam, and if the IC is in the sidelobe, then excluding the beam's response rate when estimating the location of the IC.

The foregoing detailed description has set forth various embodiments of the devices and/or processes via the use of block diagrams and/or examples. Insofar as such block diagrams and/or examples contain one or more functions and/or aspects, it will be understood by those within the art that each function and/or aspect within such block diagrams or examples may be implemented individually and/or collectively, by a wide range of hardware, software, firmware, or virtually any combination thereof. Those skilled in the art will recognize that some aspects of the embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, antennas, transmission lines, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A method to estimate a location of a Radio Frequency Identification (RFID) integrated circuit (IC) coupled to an antenna, the method comprising:
   generating multiple radio-frequency beams, each directed to a different target location;
   transmitting multiple interrogating signals on each beam;
   receiving, on each beam, at least one response from the IC to the interrogating signals;
   determining, for each beam, a response rate;
   selecting a first beam having a first response rate and a second beam having a second response rate, wherein the first beam partially overlaps the second beam to form an overlap region; and
   using a target location of the first beam, a target location of the second beam, and the first and second response rates to estimate the IC location within the overlap region.

2. The method of claim 1, wherein a ratio of a first distance between the first beam target location and the estimated IC location to a second distance between the second beam target location and the estimated IC location corresponds to a ratio of the first and second response rates.

3. The method of claim 1, further comprising:
   transmitting the multiple interrogating signals at multiple radio frequencies; and
   determining the first and second response rates at a first one of the multiple radio frequencies.

4. The method of claim 3, wherein a ratio of a first distance between the rust beam target location and the estimated IC location and to a second distance between the second beam target location and the estimated IC location corresponds to both:
   a ratio of the first response rate to the second response rate; and
   a ratio of a third response rate to a fourth response rate, wherein the third response rate is associated with the first beam, the fourth response rate is associated with the second beam, and the third and fourth response rates are determined at a second radio frequency different from the first radio frequency.

5. The method of claim 3, further comprising selecting the first radio frequency based on at least one of an environmental condition, a previously received IC response, a performance characteristic of the IC, and a tag population size.

6. The method of claim 1, further comprising refining the estimated IC location by comparing a sensitivity contour of at least one of the first and second beams to a frequency-dependent operating profile of at least one of the IC and a tag including the IC.

7. The method of claim 1, further comprising:
   selecting a third beam having a third target location and a third response rate, wherein the third beam partially overlaps the first and second beams to form the overlap region, and
   using the first, second, and third beam target locations and the first, second, and third response rates to estimate the IC location, wherein:
   a ratio of a first distance between the first beam target location and the estimated IC location to a second distance between the second beam target location and the estimated IC location corresponds to a ratio of the first and second response rates; and
   a ratio of the first distance to a third distance between the third beam target location and the estimated IC location corresponds to a ratio of the first and third response rates.

8. The method of claim 1, further comprising generating the multiple beams from at least one of a synthesized-beam RFID reader and multiple RFID readers.

9. The method of claim 1, wherein each beam response rate is a count of responses received on the respective beam divided by the number of interrogating signals transmitted on the respective beam.

10. The method of claim 1, further comprising:
    determining, based on map information, excluded locations for the RFID IC; and
    removing the excluded locations from the region.

11. A method to estimate a location of a Radio Frequency Identification (RFID) integrated circuit (IC) coupled to an antenna, the method comprising:
    generating multiple pairs of radio-frequency (RF) beams, wherein each beam pair is directed to a different target location and the beams within each beam pair cooperatively provide RF power to the target location;
    transmitting multiple interrogating signals on at least one beam of each beam pair;
    receiving, on at least one beam of each beam pair, at least one response from the IC to the interrogating signals;
    determining, for each beam pair, a response rate;
    selecting a first beam pair having a first response rate and a second beam pair having a second response rate, wherein the first beam pair partially overlaps the second beam pair to form an overlap region; and
    using a target location of the first beam pair, a target location of the second beam pair, and the first and second response rates to estimate the IC location within the overlap region.

12. The method of claim 11, wherein at least one of:
    one beam of at least one pair transmits the interrogating signal and the other beam transmits a substantially unmodulated continuous-wave signal; and
    both beams of at least one pair transmit synchronized interrogating signals.

13. The method of claim 11, wherein a ratio of a first distance between the first beam pair target location and the estimated IC location to a second distance between the second beam pair target location and the estimated IC location corresponds to a ratio of the first and second response rates.

14. The method of claim 13, further comprising:
    transmitting the multiple interrogating signals at multiple radio frequencies, and
    determining the first and second response rates at a first one of the multiple radio frequencies.

15. The method of claim 14, wherein estimating the IC location within the overlap region includes estimating the IC location such that a ratio of a first distance between the IC location and the first beam target location to a second distance between the IC location and the second beam target location corresponds to both:
    a ratio of the first response rate to the second response rate; and
    a ratio of a third response rate to a fourth response rate, wherein the third response rate is associated with the first beam pair, the fourth response rate is associated with the second beam pair, and the third and fourth response rates are determined at a second radio frequency different from the first radio frequency.

16. The method of claim 14, further comprising selecting the first frequency based on at least one of an environmental condition, previously received IC replies, a performance characteristic of the RFID IC, and a tag population size.

17. The method of claim 14, further comprising selecting transmitting radio frequencies for each beam in a pair to avoid generating beat notes.

18. The method of claim 11, further comprising:
- selecting a third beam pair having a third target location and a third response rate, wherein the third beam pair partially overlaps the first and second beam pairs to form the overlap region, and
- using the first, second, and third beam target locations and the first, second, and third response rates to estimate the IC location, wherein:
- a ratio of a first distance between the first beam pair target location and the estimated IC location to a second distance between the second beam pair target location and the estimated IC location corresponds to a ratio of the first and second response rates; and
- a ratio of the first distance to a third distance between the third target location and the estimated IC location corresponds to a ratio of the first and third response rates.

19. A method for a Radio Frequency Identification (RFID) synthesized-beam reader (SBR) to estimate a location of an RFID integrated circuit (IC) coupled to an antenna, the method comprising:
- serially synthesizing each of multiple beams according to a scan pattern, each beam directed to a respective target location;
- transmitting a series of interrogating signals on each beam;
- receiving, on each beam, at least one response from the RFID IC to the series of interrogating signals;
- determining, for each beam, a response rate;
- selecting a first beam having a first response rate and a second beam having a second response rate, wherein the first beam partially overlaps the second beam to form an overlap region; and
- using a target location of the first beam, a target location of the second beam, and the first and second response rates to estimate the IC location within the overlap region.

20. The method of claim 19, further comprising, for each beam:
- discriminating, based on the beam's response rate, whether the IC is in a sidelobe of the beam; and
- if the IC is in the sidelobe, then excluding the beam's response rate when estimating the location of the IC.

* * * * *